(12) United States Patent
Yoshitani et al.

(10) Patent No.: US 8,587,605 B2
(45) Date of Patent: Nov. 19, 2013

(54) IMAGE PROCESSING DEVICE, CONTROL METHOD FOR IMAGE PROCESSING DEVICE, CONTROL PROGRAM FOR IMAGE PROCESSING DEVICE, AND RECORDING MEDIUM IN WHICH CONTROL PROGRAM IS RECORDED

(75) Inventors: Hitoshi Yoshitani, Osaka (JP); Yuji Kamon, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 180 days.

(21) Appl. No.: 13/387,629

(22) PCT Filed: Jul. 29, 2010

(86) PCT No.: PCT/JP2010/062790
§ 371 (c)(1),
(2), (4) Date: Jan. 27, 2012

(87) PCT Pub. No.: WO2011/013748
PCT Pub. Date: Feb. 3, 2011

(65) Prior Publication Data
US 2012/0120095 A1 May 17, 2012

(30) Foreign Application Priority Data
Jul. 31, 2009 (JP) ................................ 2009-180078

(51) Int. Cl.
G09G 5/00 (2006.01)
G09G 5/02 (2006.01)
G06K 9/00 (2006.01)
H04N 5/44 (2011.01)
H04N 5/445 (2011.01)
H04N 5/50 (2006.01)
H04N 9/74 (2006.01)
G03F 3/08 (2006.01)
G06K 9/40 (2006.01)
H04N 1/46 (2006.01)
G09G 1/28 (2006.01)

(52) U.S. Cl.
USPC ............ 345/589; 345/22; 345/550; 345/602; 345/630; 345/690; 348/553; 348/560; 348/564; 348/569; 348/584; 358/518; 358/523; 358/540; 382/167; 382/254; 725/40; 725/43

(58) Field of Classification Search
USPC ......... 345/589–593, 597, 600–602, 606, 612, 345/618–619, 629–630, 547–550, 545, 204, 345/690, 7, 9–12, 22; 348/552–553, 557, 348/560, 563–567, 571, 576, 577–578, 582, 348/584, 588, 598–599; 358/518, 523–525, 358/540, 448; 382/162–167, 254, 276; 725/40–43, 48
See application file for complete search history.

(56) References Cited

U.S. PATENT DOCUMENTS 5,025,249 A * 6/1991 Seiler et al. .................... 715/803
(Continued)

FOREIGN PATENT DOCUMENTS

JP 2002-335457 A 11/2002
JP 2003-162276 A 6/2003
(Continued)

*Primary Examiner* — Wesner Sajous

(74) *Attorney, Agent, or Firm* — Birch, Stewart, Kolasch & Birch, LLP

(57) ABSTRACT

The present invention provides an image processing device capable of realizing appropriate color expression without requiring a large increase in data amount of image data for displaying a composite screen. A television broadcast receiver (1) includes a synthesis processing section (40) and an OSD processing section (24) for creating an OSD plane C as a composite screen in index color expression by combining an OSD plane U and OSD plane L, which are display screens in the index color expression. By the processing section (40) and the OSD processing section (24), the OSD plane C for attaining a display effect in which the OSD plane U and OSD plane L are superimposed is created.

10 Claims, 18 Drawing Sheets

(56) References Cited

U.S. PATENT DOCUMENTS

| | | | |
|---|---|---|---|
| 5,629,720 A * | 5/1997 | Cherry et al. | 345/601 |
| 2005/0213853 A1 | 9/2005 | Maier et al. | |
| 2006/0242416 A1* | 10/2006 | Sharma et al. | 713/176 |
| 2007/0109314 A1* | 5/2007 | Chiu et al. | 345/592 |

FOREIGN PATENT DOCUMENTS

| | | |
|---|---|---|
| JP | 2005-251193 A | 9/2005 |
| JP | 2007-171581 A | 7/2007 |
| JP | 2007-279338 A | 10/2007 |
| JP | 2008-216460 A | 9/2008 |

* cited by examiner

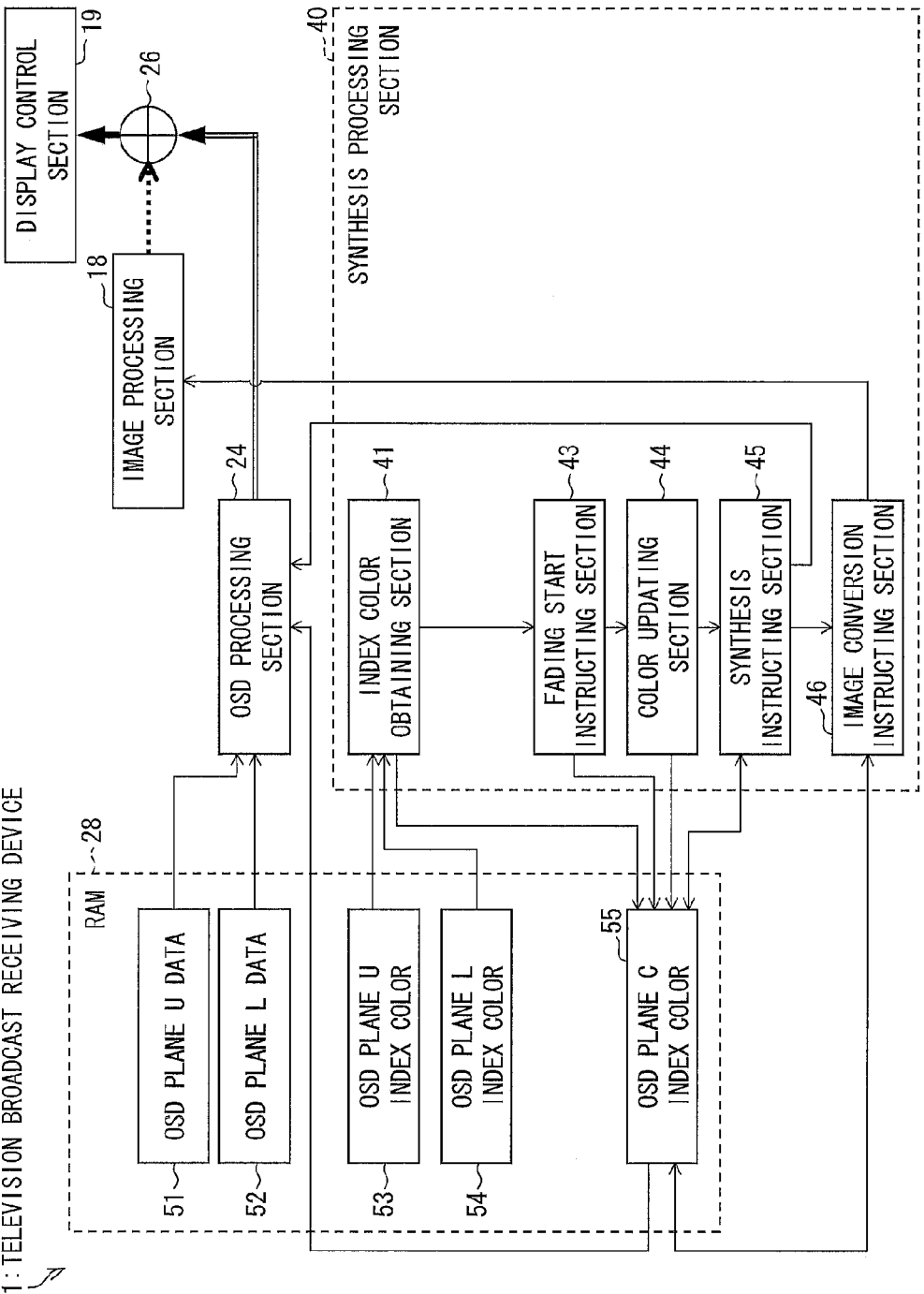

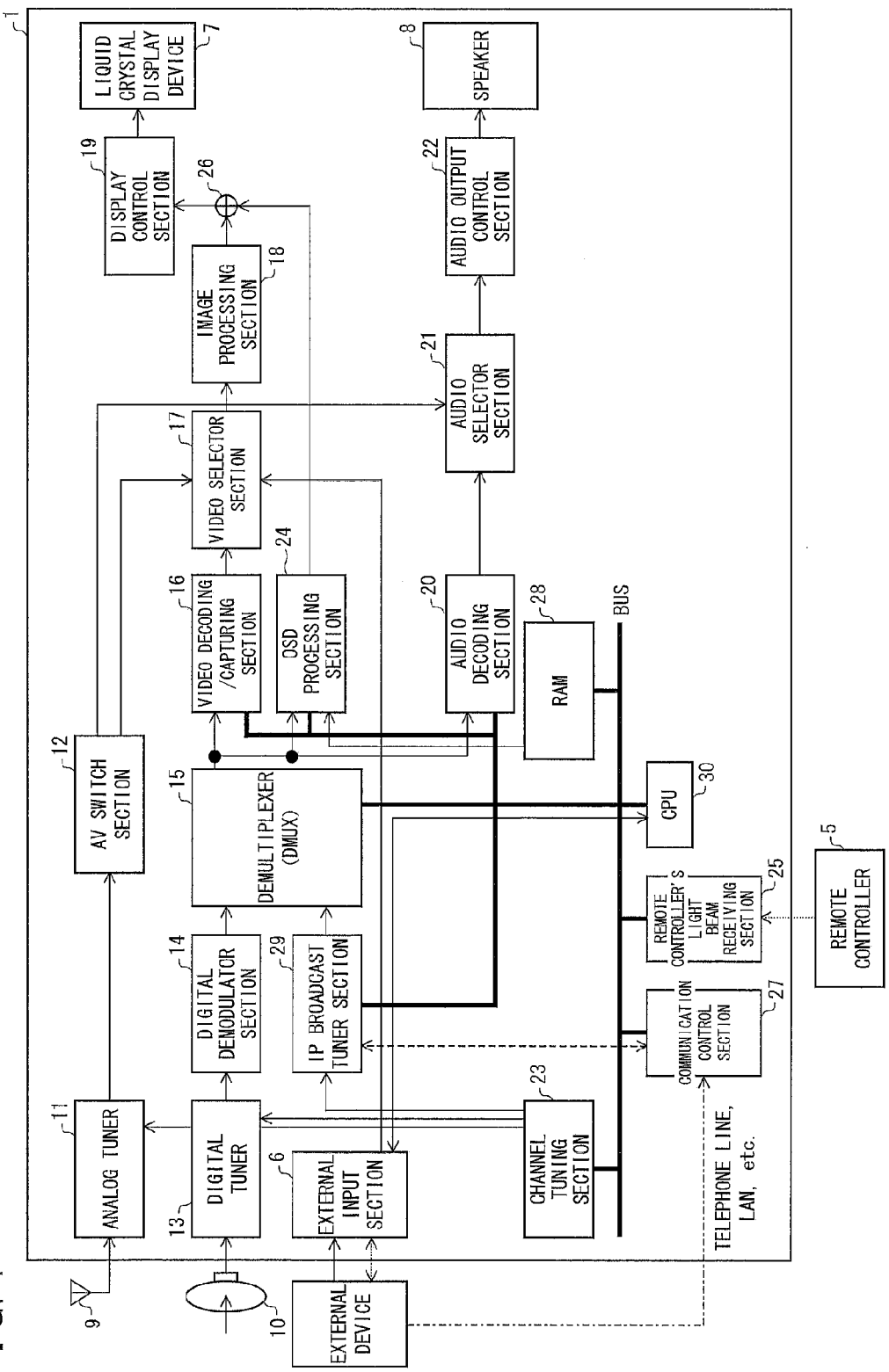
F I G. 4

| Index | α | R | G | B |
|---|---|---|---|---|
| 0 | 255 | 0 | 0 | 0 |
| ⋮ | ⋮ | ⋮ | ⋮ | ⋮ |
| 64 | 128 | 255 | 255 | 255 |
| 65 | — | — | — | — |
| ⋮ | ⋮ | ⋮ | ⋮ | ⋮ |
| 255 | — | — | — | — |

UNUSED AREA (rows 65–255)

54 : OSD PLANE U INDEX COLOR (b)

| Index | α | R | G | B |
|---|---|---|---|---|
| 0 | — | — | — | — |
| ⋮ | ⋮ | ⋮ | ⋮ | ⋮ |
| 254 | — | — | — | — |
| 255 | 0 | 0 | 0 | 0 |

UNUSED AREA (rows 0–254)

53 : OSD PLANE L INDEX COLOR

F I G. 6

| Index | α | R | G | B |
|---|---|---|---|---|
| 0 | 255 | 0 | 0 | 0 |
| ⋮ | ⋮ | ⋮ | ⋮ | ⋮ |
| 64 | 128 | 255 | 255 | 255 |
| 65 | — | — | — | — |
| ⋮ | ⋮ | ⋮ | ⋮ | ⋮ |
| 254 | — | — | — | — |
| 255 | 0 | 0 | 0 | 0 |

COPY OF OSD PLANE U INDEX COLOR (indices 0–64)

UNUSED AERA (indices 65–254)

COPY OF OSD PLANE L INDEX COLOR (index 255)

55 : OSD PLANE C INDEX COLOR

F I G. 7
| Index | α | R | G | B |
|---|---|---|---|---|
| 0 | 255 | 0 | 0 | 0 |
| 1 | 128 | 0 | 0 | 0 |
| 2 | 255 | 255 | 0 | 0 |
| 3 | 128 | 255 | 0 | 0 |
| ⋮ | ⋮ | ⋮ | ⋮ | ⋮ |
| 255 | 0 | 0 | 0 | 0 |
56 : COPY DATA
| Index | α | R | G | B |
|---|---|---|---|---|
| 0 | 255 | 0 | 0 | 0 |
| 1 | 128 | 0 | 0 | 0 |
| 2 | 255 | 255 | 0 | 0 |
| 3 | 128 | 255 | 0 | 0 |
| ⋮ | ⋮ | ⋮ | ⋮ | ⋮ |
| 255 | 0 | 0 | 0 | 0 |
55 : OSD PLANE C
INDEX COLOR

| Index | α | R | G | B |
|---|---|---|---|---|
| 0 | 255 | 0 | 0 | 0 |
| 1 | 128 | 0 | 0 | 0 |
| 2 | 255 | 255 | 0 | 0 |
| 3 | 128 | 255 | 0 | 0 |
| ⋮ | ⋮ | ⋮ | ⋮ | ⋮ |
| 255 | 0 | 0 | 0 | 0 |

56 : COPY DATA

| Index | α | R | G | B |
|---|---|---|---|---|
| 0 | 255 | 0 | 0 | 0 |
| 1 | 128 | 0 | 0 | 0 |
| 2 | 255 | 255 | 0 | 0 |
| 3 | 255→128 | 128→255 | 0 | 0 |
| ⋮ | ⋮ | ⋮ | ⋮ | ⋮ |
| 255 | 255→0 | 0 | 0 | 0 |

55 : OSD PLANE C
INDEX COLOR

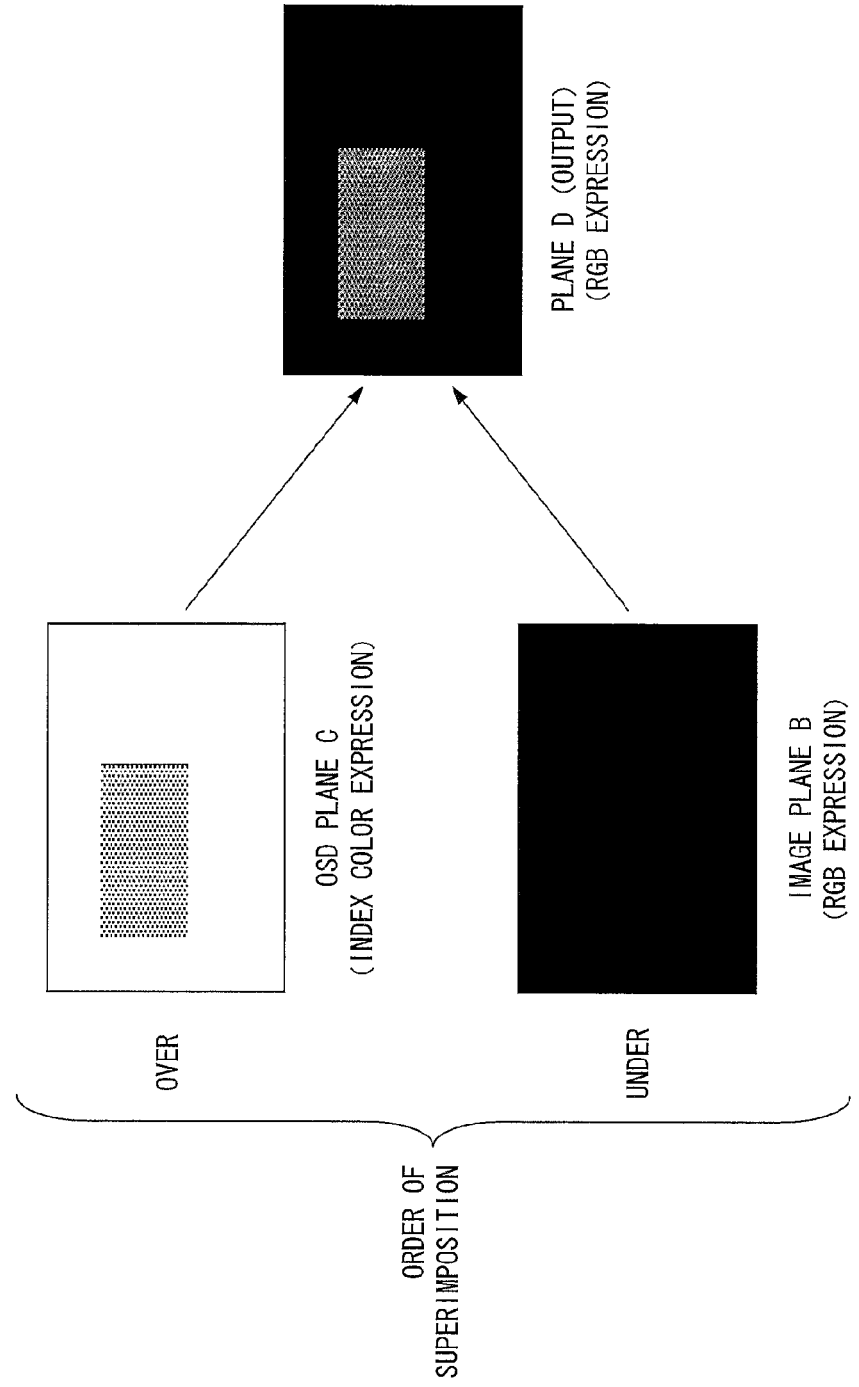
F I G. 1 3

F I G. 1 5
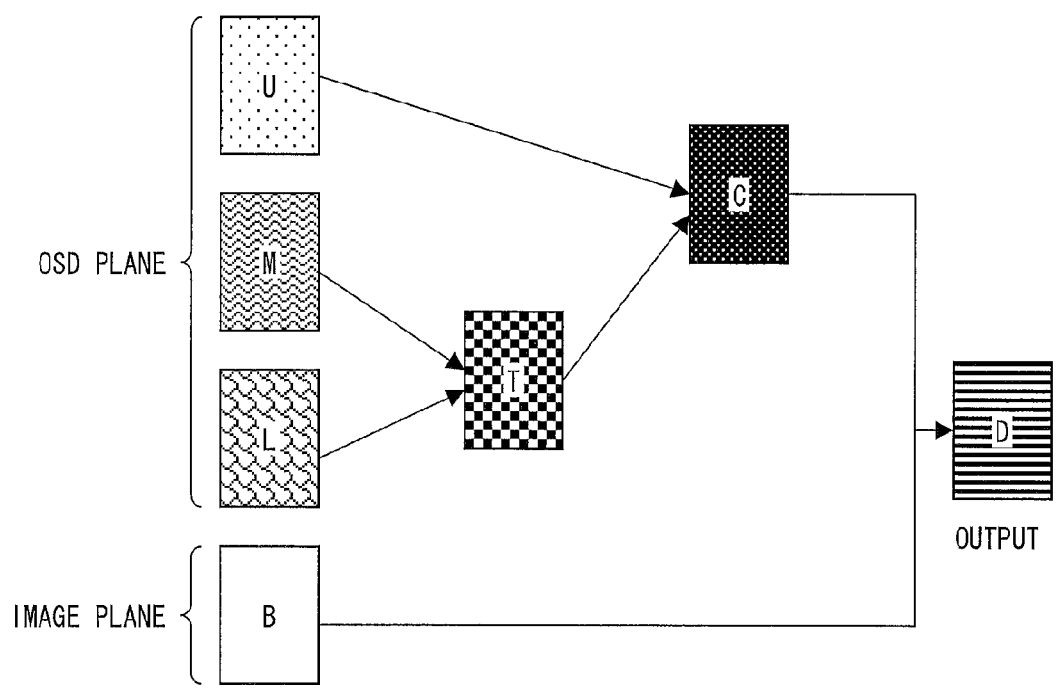
F I G. 1 6
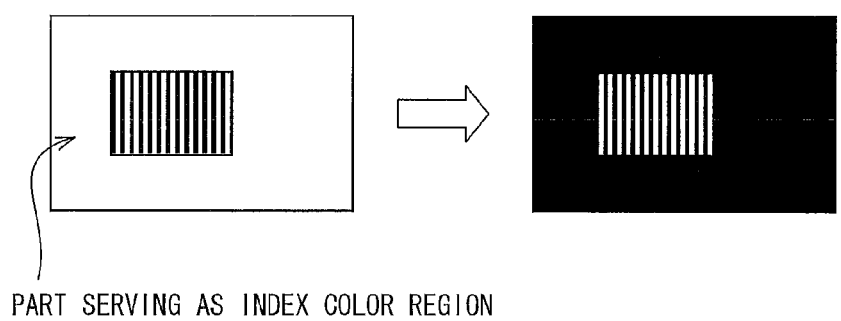
PART SERVING AS INDEX COLOR REGION

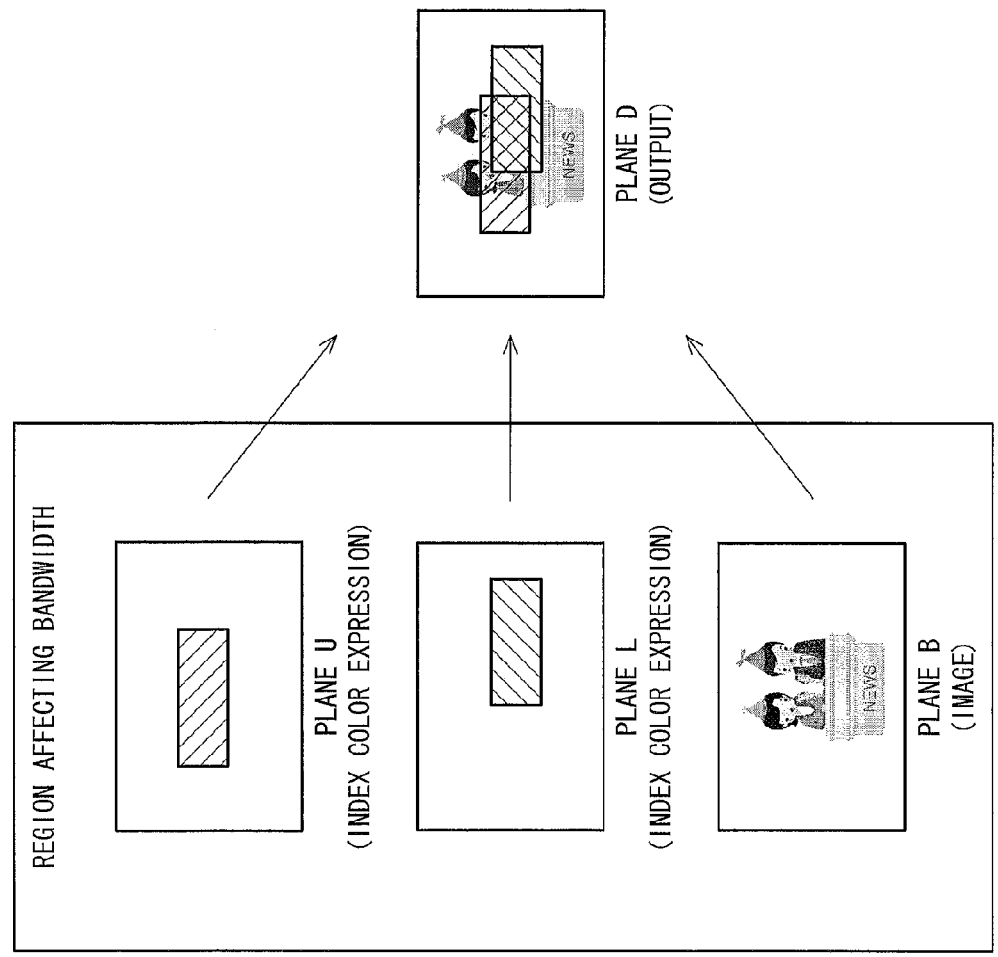

IMAGE PROCESSING DEVICE, CONTROL METHOD FOR IMAGE PROCESSING DEVICE, CONTROL PROGRAM FOR IMAGE PROCESSING DEVICE, AND RECORDING MEDIUM IN WHICH CONTROL PROGRAM IS RECORDED

TECHNICAL FIELD

The present invention relates to an image processing device for outputting an output in which an OSD display screen (which is a display screen displayed by an On-Screen-Display function) is superimposed on an image display screen based on image dada.

BACKGROUND ART

Display devices such as televisions, etc. has an OSD (On-Screen-Display) function, so as to display a menu screen thereon for setting. Moreover, such display devices are configured to be able to display subtitles, data broadcast or the like apart from the menu display, by using the OSD function. Hereinafter, a display operation for display a certain screen by using the OSD function is referred to as an OSD display operation. The OSD display operation is carried out such that a 2-dimensional plane region (hereinafter, referred to as an OSD plane) for image formation for a menu screen, subtitle, or the like is set, and the OSD plane is outputted on a display section of the display device.

Moreover, in the OSD display, pixel colors in image data are generally expressed based on a RGB expression or a YCbCr expression. In this case, however, such problems should be encountered that storing the pixel colors expressed on the RGB expression or the YCbCr expression requires the memory to store a large data amount to occupy a memory space, updating the OSD display requires a high read/write speed to perform reading and writing to the memory, that is, requires a wider bandwidth for memory. In order to encounter this problems, a technique in which the pixel colors are expressed based on an index color expression is adopted. That is, in general, the display devices expresses colors by combinations of intensities of RGB. However, when the index color expression is used, only necessary one or ones of the combinations are selected and indexed, so that the pixel colors are indicated by color codes. Moreover, in order to display or convert the pixel colors, a look-up table (pallet (CLUT)) between the color codes and the colors of the RGB expression is referred to allot actual colors to the pixels.

In some cases, it is demanded that OSD planes for different kinds of usages should be displayed in combination with each other in superimposition with an image. In such cases, a plurality of OSD planes are required. How many OSD planes can be displayed is dependent on such hardware restrictions as a storage capacity of the memory to store the image data for image formation in the OSD planes, read/write speed of OSD display data to the memory, that is, bandwidth etc. of the memory. As such, the number of the OSD planes to be displayed is restricted. In case where a plurality of OSD planes are superimposed and thereby combined with each other, the following problems are encountered when such a composite OSD plane prepared by combining the OSD planes is displayed.

For example, as illustrated in FIG. 2, there is a case where a composite product (composite screen) synthesized by partially imposing OSD planes U and L expressed in the index color expression has an superimposed portion F at which the OSD planes U and L are superimposed. If the composite screen is also expressed in the index color expression, the superimposed portion F sometimes has a color that does not exist on a pallet for the composite screen. In such a case, a color of one of the OSD planes U and L which is superimposed over the other is adopted as the color of the portion F (in FIG. 2, the color of the OSD plane U is adopted). That is, there is a problem that the superimposition of displays in the OSD planes U and L cannot be precisely expressed. Note that FIG. 2 is a view of a conventional art and illustrates an example of a composite screen synthesized by superimposing the different OSD planes U and L expressed in the index color expression.

In order to appropriately express the color of the superimposed portion F, it can be considered to synthesize a composite product by combining the OSD planes U and L converted from the index color expression to the RGB expression, as illustrated in FIG. 3. Note that FIG. 3 is a view of a conventional art and illustrates a composite product synthesized by superimposing the different OSD planes U and L expressed in the index color expression and converted to the RGB expression. However, in this case, the composite screen should be stored in the RGB expression, thereby requiring the memory or the like to store a larger data amount than storing the composite screen in the index color expression as illustrated in FIG. 2.

Moreover, the OSD plane can be used not only for displaying the aforementioned display contents but also for giving a fading effect to an image displayed on the display device. The fading effect may be a fading-out process for darkening an image gradually to black and a fade-in process for appearing an image gradually from a black display. In general, such a fading effect is realized by specially using an OSD plane colored in a particular color (usually black) for the fading effect (see Patent Literature 1, for example). In a broadcast receiving device disclosed in Patent Literature 1, fading out is carried out by gradually increasing transmittance of a black OSD plane from 0% to 100%. On the contrary, fading in is carried out by gradually decreasing the transmittance of the black OSD plane from 100% to 0%.

Moreover, Patent Literature 2 discloses an electronic circuit capable of combining various OSD images (OSD planes) with a source image (image). The electronic circuits causes a memory to store therein (i) the source image, (ii) index color data indicative of color codes of pixels constituting the OSD image, (iii) pallet data including image signal values and α values for indicating composition ratios. By an image processing section of the electronic circuit, a color for each pixel is determined by combining, at a composition ratio determined by an α value, the source image data with an image signal value indicated by the color code. By this, the electronic circuit can change a transmittance of an OSD image by updating the α values, thereby being able to synthesize various OSD images. It is also possible that different OSD planes are combined and displayed in combination, where one of the different OSD planes is utilized to attain such a display effect, such as fading effect, that a display is dynamically changed over a certain time period. If the composite screen of such a display is stored in the index color expression, the superimposed portion F of the composite screen would possibly fail to appropriately reflect the dynamic display change. For example, in case of the one of the OSD planes that is monocolored and whose transmittance is changed, a color of the other one of the OSD planes cannot be appropriate if, in the superimposed portion F the color of the one of the OSD planes as a result of the change in the transmittance does not exist on the pallet of the composite screen. Thus, in case where the composite screen is stored in the index color expression, there is a possibility that the composite screen thus stored does not reflect the dynamic display change appropriately. Moreover, it can be considered to express and store the composite screen in the RGB expression. In this case, as described above, the composite screen can reflect the dynamic display change appropriately, but results in an increase in data amount to display the composite screen.

Citation List

Patent Literature 1
Japanese Patent Application Publication, Tokukai, No. 2002-335457 (published on Nov. 22, 2002)
Patent Literature 2
Japanese Patent Application Publication, Tokukai, No. 2008-216460 (published on Sep. 18, 2008)

SUMMARY OF INVENTION

Technical Problem

The conventional arts described above has problems in that they cannot realize appropriate color expression without increasing the data amount of the image data associated with the display of the composite screen.

For example, in case where an image is modified with a display effect obtained by combining different OSD display images (OSD plane U and OSD plane L) as described in FIG. 19, the plurality of OSD planes are superimposed on the image. In this case, if the composite screen, which is a composite product synthesized by combining the OSD plane U and OSD plane L, is stored in the index color expression, there is a possibility that appropriate color expression cannot be done to the superimposed portion between the OSD plane U and OSD plane L in the composite screen. Note that FIG. 19 is a view illustrating a conventional art for the present invention and illustrates an example in which a plurality of OSD planes and an image are displayed in superimposition.

On the other hand, if the composite screen is stored in the RGB expression in order to attain appropriate color expression in the superimposed portion, the data amount to be stored becomes large, as described above.

Especially, in case where the color in one of different OSD planes is dynamically changed like the fading effect, it is not possible to adjust the color expression in the other one of the OSD planes to be in conformity with the color change.

Note that Patent Literatures 1 and 2 does not assume to obtain a display effect by combining a plurality of OSD display screens (OSD planes). That is, the arrangements disclosed in Patent Literatures 1 and 2, it is not possible to attain a display effect obtained by combining different OSD display screens.

The present invention is accomplished in view of the aforementioned problems, and an object of the present invention is to realize an image processing device, a control method for the same, a control program for the same, and a recording medium in which the control program is recorded, each of which can realize appropriate color expression without requiring a large increase in data amount of image data for displaying a composite screen.

Solution to Problem

In order to attain the object, an image processing device according to the present invention is an image processing device, which combines a first display screen and a second display screen, which are display screens expressed in index color expression in which pixel colors of pixels are indicated by color codes selected and combined as necessary from among R, G, and B, the image processing device including: a memory device for storing therein a first look-up table and a second look-up table, wherein the first look-up table shows association between the color codes and RGB expression for the pixel colors of the pixels constituting the first display screen, and includes values respectively indicating intensities of R, G, and B, and an α value indicating transmittance, and the second look-up table shows association between the color codes and RGB expression for the pixel colors of the pixels constituting the second display screen, and includes values respectively indicating intensities of R, G, and B, and an α value indicating transmittance; and creating means for creating a composite screen in the index color expression by combining the first display screen and the second display screen in such a manner that a display effect obtainable by superimposing the first display screen and the second display screen is obtained, the creating means including: look-up table creating means for creating, from the first look-up table and the second look-up table, a third look-up table for showing association between color codes and RGB expression for pixel colors of pixels constituting the composite screen; changing means for changing the third look-up table in such a manner that values respectively corresponding to the values respectively indicating intensities of R, G, and B, and the α value of a certain color code in the first look-up table are changed; updating means for rewriting the third look-up table in such a manner that, based on the values changed by the changing means, values respectively corresponding to the values respectively indicating intensities of R, G, and B, and the α value in the second look-up table are rewritten so as to obtain color expression corresponding to colors obtainable by superimposing the first display screen and the second display screen; and composite screen creating means for creating the composite screen by referring to the third look-up table thus rewritten by the updating means.

With this configuration, in which the memory device stores therein a first look-up table and a second look-up table and the creating means is provided, it is possible to create a composite screen expressed in the index color expression from the first display screen and the second display screen expressed in the index color expression.

Moreover, because the creating means includes the look-up table creating means, it is possible to create the third look-up table regarding the pixel color of each pixel constituting the composite screen. The first, second, and third look-up tables may be managed as independent look-up tables in the memory device, or may be created in one look-up table to indicate association between the color codes and RGB expression for the pixel colors of the pixels constituting the first display screen, the second display screen, and the third display screen.

Moreover, because the changing means is provided, it is possible to change the color expression of a given color code in the first display screen portion in the composite screen. Note that the color expression encompasses the following cases, for example: transmittance of a mono color corresponding to the color code is changed; the mono color of the color code is changed to another mono color; etc.

Further, because the creating means includes the updating means, it is possible to change the color expression in the second display screen portion according to the change in the color expression in the first display screen portion, so that a color expression corresponding to the color obtainable by superimposing the first display screen and the second display screen can be attained. Further, because the composite screen creating means is provided, it is possible to create a composite screen in which the color expression in the second display screen portion has been changed according to the change in the color expression of the first display screen portion.

Therefore, in case where a composite screen is created by combining a plurality of display screens expressed in the index color expression, the image processing device according to the present invention makes it possible to use the index color expression to express color expression corresponding to a color obtainable by superimposing the plurality of display screens in the composite screen.

Moreover, because it is possible to express the composite screen in the index color expression, the present invention does not requires an increase in the data amount of image data to be displayed, compared with the case where the composite screen is expressed in the RGB expression, for example.

Thus, the image processing device according to the present invention makes it possible to realize appropriate color expression while avoiding an increase in the data amount of image data for displaying a composite screen.

In order to attain the object, a control method according to the present invention is a control method for controlling an image processing device, which combines a first display screen and a second display screen, which are display screens expressed in index color expression in which pixel colors of pixels are indicated by color codes selected and combined as necessary from among R, G, and B, wherein: the image processing device includes a memory device for storing therein a first look-up table and a second look-up table, wherein the first look-up table shows association between the color codes and RGB expression for the pixel colors of the pixels constituting the first display screen, and includes values respectively indicating intensities of R, G, and B, and an α value indicating transmittance, and the second look-up table shows association between the color codes and RGB expression for the pixel colors of the pixels constituting the second display screen, and includes values respectively indicating intensities of R, G, and B, and an α value indicating transmittance, the method comprises: creating a composite screen in the index color expression by combining the first display screen and the second display screen in such a manner that a display effect obtainable by superimposing the first display screen and the second display screen is obtained, the step of creating including: a look-up table creating step for creating, from the first look-up table and the second look-up table, a third look-up table for showing association between color codes and RGB expression for pixel colors of pixels constituting the composite screen; a changing step for changing the third look-up table in such a manner that values respectively corresponding to the values respectively indicating intensities of R, G, and B, and the α value of a certain color code in the first look-up table are changed; an updating step for rewriting the third look-up table in such a manner that, based on the values changed by the changing step, values respectively corresponding to the values respectively indicating intensities of R, G, and B, and the α value in the second look-up table are rewritten so as to obtain color expression corresponding to colors obtainable by superimposing the first display screen and the second display screen; and a composite screen creating step for creating the composite screen by referring to the third look-up table thus rewritten by the updating step. With this method, in which the memory device stores therein a first look-up table and a second look-up table and the creating step is provided, it is possible to create a composite screen expressed in the index color expression from the first display screen and the second display screen expressed in the index color expression.

Moreover, because the creating step includes the look-up table creating step, it is possible to create the third look-up table regarding the pixel color of each pixel constituting the composite screen. The first, second, and third look-up tables may be managed as independent look-up tables in the memory device, or may be created in one look-up table to indicate association between the color codes and RGB expression for the pixel colors of the pixels constituting the first display screen, the second display screen, and the third display screen.

Moreover, because the changing step is provided, it is possible to change the color expression of a given color code in the first display screen portion in the composite screen. Note that the color expression encompasses the following cases, for example: transmittance of a mono color corresponding to the color code is changed; the mono color of the color code is changed to another mono color; etc.

Further, because the creating step includes the updating step, it is possible to change the color expression in the second display screen portion according to the change in the color expression in the first display screen portion, so that a color expression corresponding to the color obtainable by superimposing the first display screen and the second display screen can be attained. Further, because the composite screen creating step is provided, it is possible to create a composite screen in which the color expression in the second display screen portion has been changed according to the change in the color expression of the first display screen portion.

Therefore, in case where a composite screen is created by combining a plurality of display screens expressed in the index color expression, the control method according to the present invention for controlling the image processing device makes it possible to use the index color expression to express color expression corresponding to a color obtainable by superimposing the plurality of display screens in the composite screen.

Moreover, because it is possible to express the composite screen in the index color expression, the present invention does not requires an increase in the data amount of image data to be displayed, compared with the case where the composite screen is expressed in the RGB expression, for example.

Thus, the control method according to the present invention for controlling the image processing device makes it possible to realize appropriate color expression while avoiding an increase in the data amount of image data for displaying a composite screen.

Advantageous Effects of Invention

As described above, an image processing device according to the present invention is an image processing device, which combines a first display screen and a second display screen, which are display screens expressed in index color expression in which pixel colors of pixels are indicated by color codes selected and combined as necessary from among R, G, and B, the image processing device including: a memory device for storing therein a first look-up table and a second look-up table, wherein the first look-up table shows association between the color codes and RGB expression for the pixel colors of the pixels constituting the first display screen, and includes values respectively indicating intensities of R, G, and B, and an α value indicating transmittance, and the second look-up table shows association between the color codes and RGB expression for the pixel colors of the pixels constituting the second display screen, and includes values respectively indicating intensities of R, G, and B, and an α value indicating transmittance; and creating means for creating a composite screen in the index color expression by combining the first display screen and the second display screen in such a manner that a display effect obtainable by superimposing the first display screen and the second display screen is obtained, the creating means including: look-up table creating means for creating, from the first look-up table and the second look-up table, a third look-up table for showing association between color codes and RGB expression for pixel colors of pixels constituting the composite screen; changing means for changing the third look-up table in such a manner that values respectively corresponding to the values respectively indicating intensities of R, G, and B, and the α value of a certain color code in the first look-up table are changed; updating means for rewriting the third look-up table in such a manner that, based on the values changed by the changing means, values respectively corresponding to the values respectively indicating intensities of R, G, and B, and the α value in the second look-up table are rewritten so as to obtain color expression corresponding to colors obtainable by superimposing the first display screen and the second display screen; and composite screen creating means for creating the composite screen by referring to the third look-up table thus rewritten by the updating means.

Thus, the image processing device according to the present invention makes it possible to realize appropriate color expression while avoiding an increase in the data amount of image data for displaying a composite screen.

As described above, a control method according to the present invention is a control method for controlling an image processing device, which combines a first display screen and a second display screen, which are display screens expressed in index color expression in which pixel colors of pixels are indicated by color codes selected and combined as necessary from among R, G, and B, wherein: the image processing device includes a memory device for storing therein a first look-up table and a second look-up table, wherein the first look-up table shows association between the color codes and RGB expression for the pixel colors of the pixels constituting the first display screen, and includes values respectively indicating intensities of R, G, and B, and an α value indicating transmittance, and the second look-up table shows association between the color codes and RGB expression for the pixel colors of the pixels constituting the second display screen, and includes values respectively indicating intensities of R, G, and B, and an α value indicating transmittance, the method comprises: creating a composite screen in the index color expression by combining the first display screen and the second display screen in such a manner that a display effect obtainable by superimposing the first display screen and the second display screen is obtained, the step of creating including: a look-up table creating step for creating, from the first look-up table and the second look-up table, a third look-up table for showing association between color codes and RGB expression for pixel colors of pixels constituting the composite screen; a changing step for changing the third look-up table in such a manner that values respectively corresponding to the values respectively indicating intensities of R, G, and B, and the α value of a certain color code in the first look-up table are changed; an updating step for rewriting the third look-up table in such a manner that, based on the values changed by the changing step, values respectively corresponding to the values respectively indicating intensities of R, G, and B, and the α value in the second look-up table are rewritten so as to obtain color expression corresponding to colors obtainable by superimposing the first display screen and the second display screen; and a composite screen creating step for creating the composite screen by referring to the third look-up table thus rewritten by the updating step. With this method, in which the memory device stores therein a first look-up table and a second look-up table and the creating step is provided, it is possible to create a composite screen expressed in the index color expression from the first display screen and the second display screen expressed in the index color expression.

Thus, the control method according to the present invention for controlling the image processing device makes it possible to realize appropriate color expression while avoiding a large increase in the data amount of image data for displaying a composite screen.

BRIEF DESCRIPTION OF DRAWINGS

FIG. 1 illustrates one embodiment of the present invention and is a block diagram for illustrating a software configuration, which a television broadcast receiving device has for a combining process.

FIG. 4 is a block diagram illustrating a main configuration of the television broadcast receiving device according to one embodiment of the present invention.

FIG. 5 illustrate one embodiment of the present invention, and are views illustrating one example of index colors for OSD plane U.

FIG. 6 illustrates one embodiment of the present invention, and is a view illustrating one example of index colors for OSD plane L.

FIG. 7 is a view illustrating one embodiment of the present invention and illustrates one example of creating copy data from index colors for plane C.

FIG. 13 is a view illustrating, the OSD plane C, the image plane B, and a composite product synthesized therefrom, wherein the OSD plane C is in a state to display in its initial display and the image plane B is in a state to display a black screen display.

FIG. 15 is a view illustrating one embodiment of the present invention and illustrates one example of combining three different OSD planes U, L, and M.

FIG. 16 is a view illustrating one embodiment of the present invention and illustrates one example of giving a fading effect to part of an image.

FIG. 17 is a referential view illustrating one example of a configuration in which a plurality of OSD planes and an image plane are outputted and displayed concurrently.

DESCRIPTION OF EMBODIMENTS

Figure 2:
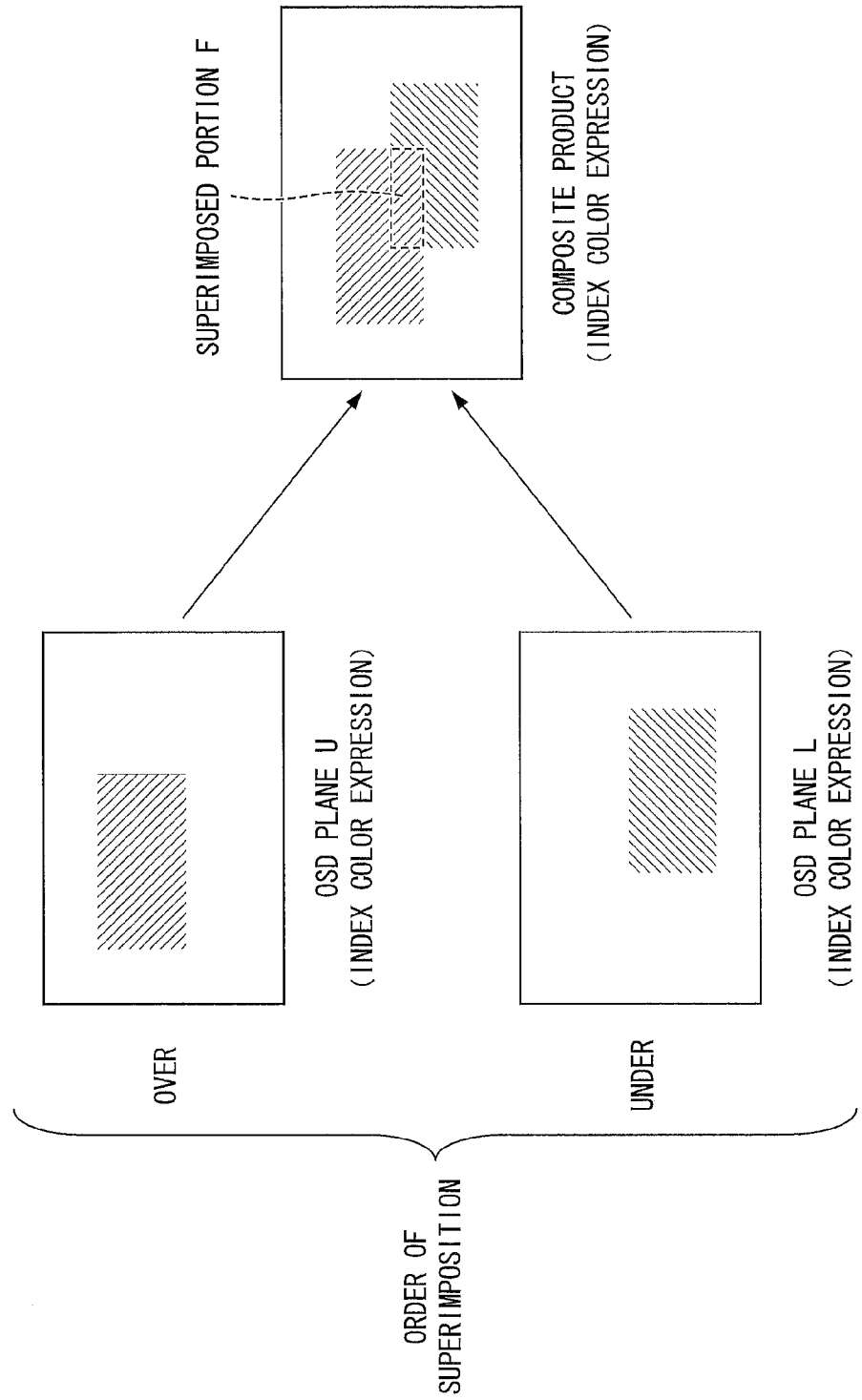
FIG. 2 is a view of a conventional art and illustrates an example of a composite product synthesized by superimposing the different OSD planes U and L expressed in the index color expression.

In the following, embodiments of the present invention is described in detail, referring to FIGS. 1, and 4 to 18. A television broadcast receiving device (image processing device) 1 according to the present embodiment is capable of receiving EPG data together with image data and audio data, and displaying an electronic program guide (EPG) on its screen according to the EPG data thus received. Moreover, the television broadcast receiving device 1 is also capable of displaying, according to a user's input, a menu screen, subtitle, or a text broadcast screen, for example. The electronic program guide, the subtitle, the menu screen, and the text broadcast screen, etc. are displayed by using an OSD function. Moreover, the television broadcast receiving device 1 is also capable of displaying an OSD plane for the electronic program guide, the subtitle, the menu screen, the text broadcast screen, etc. in such a manner that the OSD is superimposed on an image (image plane) based on the image data.

Moreover, the television broadcast receiving device 1 is also capable of displaying, in combination, a plurality of OSD planes for different display usages. The different display usages may be, for example, displaying different display contents such as the menu screen, the text broadcast screen, the subtitle, and the electronic program guide, or may be displaying for different display purposes, such as displaying for presenting information, e.g. displaying the menu screen, the text broadcast screen, the subtitle, the electronic program guide, or the like, and displaying for giving a fading effect to a display screen.

In case of displaying a plurality of OSD plane for different display usages on a display device, the following problems should be encountered.

As illustrated in FIG. 17, in case where an image plane and a plurality of OSD planes are displayed concurrently in superimposition, the display device should perform overwriting of the OSD planes in accordance with updating of the display in the image plane. In this case, the OSD plane (OSD planes U and L) should be subjected to the following processes. That is, the display device reads out OSD display data for respective image formation in each of the OSD planes every time the display in the image plane B is updated. Then, referring to a pallet, the display device converts the OSD display data from index color expression to RGB expression, and outputs the OSD display data together with the image plane B. In this configuration of the display device, it is necessary to access to the OSD display data of the OSD planes every time the display in the image plane B is updated. Such a configuration requires a greater memory bandwidth for a greater number of OSD planes.

Moreover, because the display device is restricted by its hardware configuration as to how many OSD planes the display device can display, the display device configured to output the OSD planes together with the image plane B would sometimes fail to output one or some of the OSD planes supposed to be outputted together with the image plane B.

Figure 18:
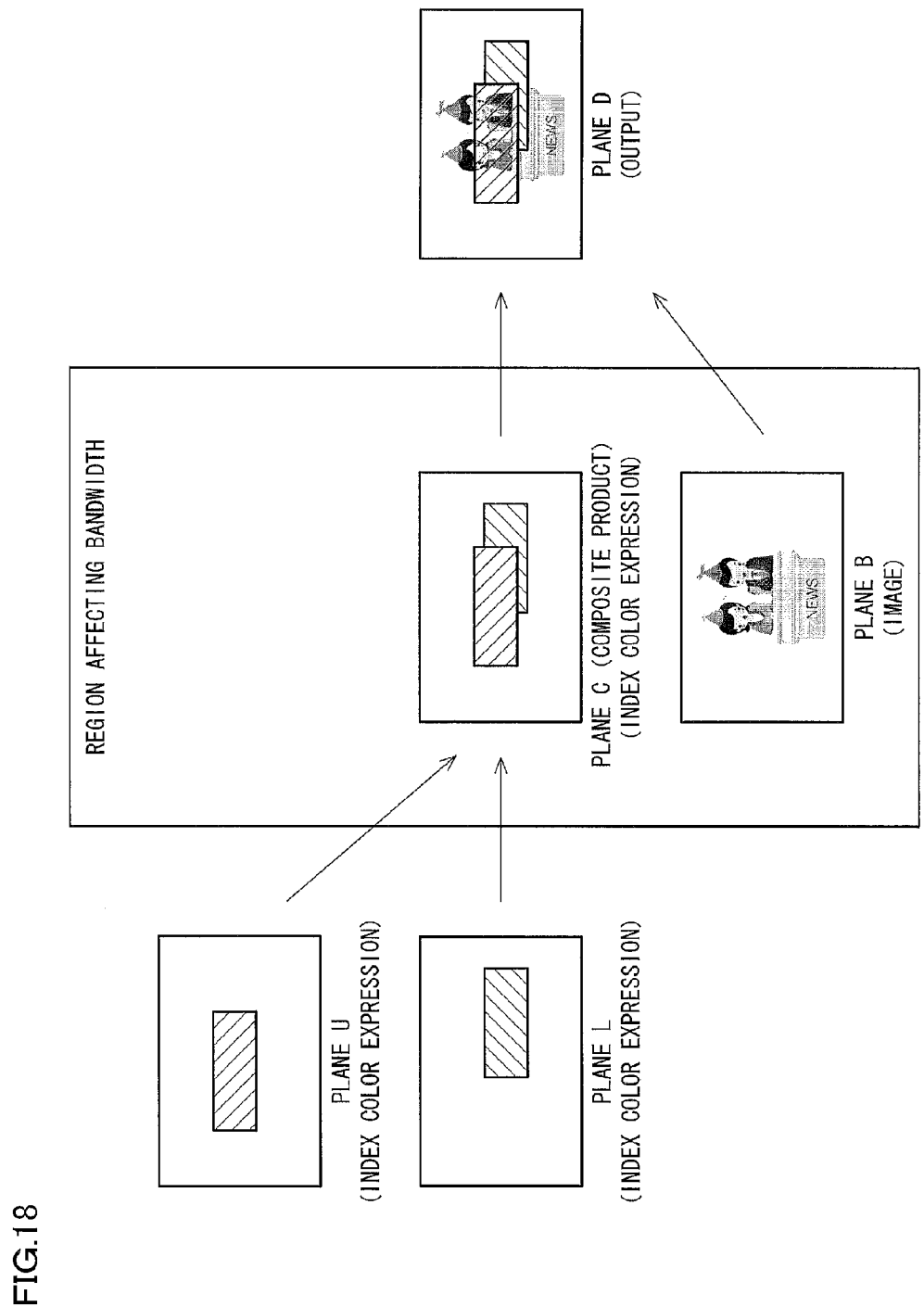
FIG. 18 is a view illustrating one example of a configuration in which a composite OSD plane obtained by combining a plurality of OSD planes and an image plane are outputted and displayed.
Figure 19:
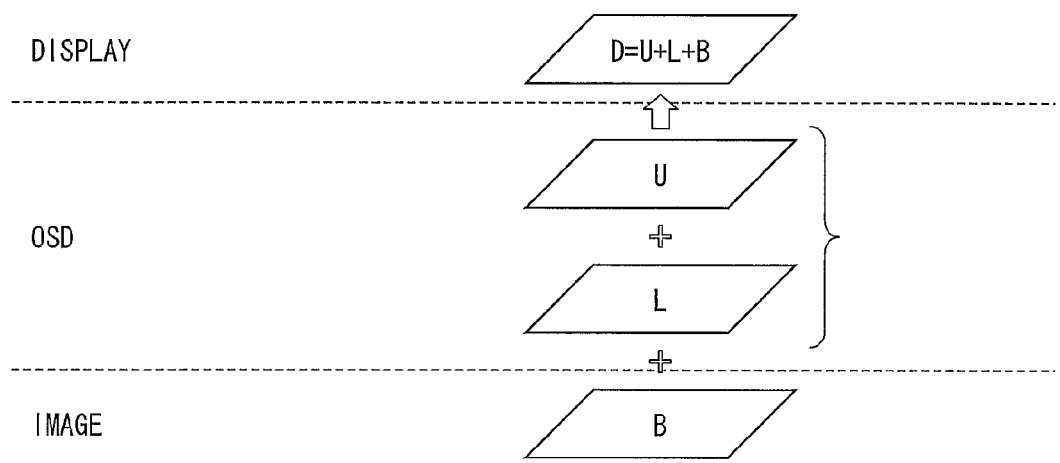
FIG. 19 is a view illustrating a conventional art for the present invention and illustrates an example in which a plurality of OSD planes and an image are displayed in superimposition.

To encounter this problem, the television broadcast receiving device 1 according to the present embodiment is configured such that, as illustrated in FIG. 18, a plurality of OSD planes (OSD planes U and L) in the index color expression is combined to produce, as a composite product, an OSD plane C, which is a virtual plane expressed in the index color expression, and then the OSD plane C and the image plane B are outputted in superimposition. The television broadcast receiving device 1 according to the present embodiment can consolidate the plurality of the OSD planes to one virtual OSD plane C before displaying the OSD planes in superimposition with the image plane B. Thus, even if the number of the OSD planes is increased, it is possible to avoid a large increase in the memory bandwidth necessary in association with the display operation. FIG. 17 is a referential view illustrating one example of a configuration in which a plurality of OSD planes and an image plane are outputted and displayed concurrently. FIG. 18 is a view illustrating one example of a configuration in which a composite OSD plane obtained by combining a plurality of OSD planes and an image plane B are outputted and displayed.

An updating cycle of the OSD plane C in which the OSD display data for forming the OSD plane U and the OSD display data for forming the OSD plane L are read out and the OSD plane C is synthesized is smaller in number than an updating cycle of the display screen of the liquid crystal display device in which the OSD plane C and the image plane B are outputted to the display screen. Thus, the memory bandwidth necessary for maintaining the OSD plane C is smaller than a memory bandwidth necessary for outputting the OSD plane C and the image plane B to the display screen of the liquid crystal display device. Therefore, in order to output a plurality of OSD planes and an image plane B together, a smaller memory bandwidth is required in the configuration, like the television broadcast receiving device 1 according to the present embodiment, in which a plurality of OSD planes are consolidated into one OSD plane and the consolidated OSD plane is outputted together with the image plane B.

Further, the television broadcast receiving device 1 according to the present embodiment is so configured to be able to appropriately express the superimposed portion F between the different OSD planes U and L.

In the following, a main configuration of the television broadcast receiving device 1 according to the present embodiment is described. Next, how the television broadcast receiving device 1 performs the process of combining the different OSD planes U and L is described. Note that the OSD plane L corresponds to a first display screen of the present invention, the OSD plane U corresponds to a second display screen of the present invention, and the OSD plane C corresponds to a consolidated screen of the present invention, and the image plane B corresponds to a third display screen of the present invention.

(Main Configuration of Television Broadcast Receiving Device)

Referring FIG. 4, the main configuration of the television broadcast receiving device 1 according to the present embodiment is described. FIG. 4 is a block diagram illustrating a main configuration of the television broadcast receiving device 1 according to one embodiment of the present invention.

As illustrated in FIG. 4, the television broadcast receiving device 1 includes an external input section 6, a liquid crystal display device 7, a speaker 8, an analog broadcast antenna 9, a digital broadcast antenna 10, an analog tuner 11, an AV switch section 12, a digital tuner 13, a digital demodulator section 14, a demultiplexer (DMUX) 15, a video decoding/capturing section 16, a video selector section 17, a video processing section 18, a display control section (output means) 19, an audio decoding section 20, an audio selector section 21, an audio output control section 22, a channel tuning section 23, an OSD processing section (creating means, a composite screen creating means) 24, a remote controller's light beam receiving section 25, a communication control section 27, an RAM (memory) 28, an IP broadcast tuner section 29, and a CPU 30.

The analog tuner 11 is configured to perform tuning for a broadcast signal to be received via the analog broadcast antenna 9. The analog tuner 11 performs the tuning of the broadcast signal according to a tuning instruction from the channel tuning section 23.

The AV switch section 12 is configured to extract an audio signal and a video signal from the broadcast signal selected by the tuning performed by the analog tuner 11. The AV switch section 12 sends the extracted audio signal and the extracted video signal to the audio selector section 21 and the video selector section 17, respectively.

The digital tuner 13 is configured to perform tuning for a particular broadcast signal to be received via a digital broadcast antenna 10. The digital tuner 13 performs the tuning of the broadcast signal according to a tuning instruction from the channel tuning section 23.

The digital demodulator section 14 is configured to demodulate the broadcast signal of the digital broadcast thus tuned. The digital demodulator section 14 outputs, to the demultiplexer (DMUX) 15, data obtained by demodulation of the broadcast signal supplied from the digital tuner 13.

The IP broadcast tuner section 29 is configured to perform tuning for a broadcast signal of an IP broadcast received via the communication control section 27 (later described). The IP broadcast tuner section 29 performs the tuning according to a tuning instruction from the channel tuning section 23. The IP broadcast tuner section 29 performs the tuning for the particular broadcast signal and outputs the received broadcast signal to the demultiplexer (DMUX) 15.

The demultipluxer (DMUX) 15 is configured to demultiplex, into the video signal and the audio signal, a multiplexed signal supplied from the digital demodulator section 14 or the IP broadcast tuner section 29. Further, the demultiplexer (DMUX) 15 is also configured to extract, from the broadcast signal, digital data such as EPG data etc. The demultiplexer (DMUX) 15 sends the demultiplexed video signal, the demultiplexed audio signal, and the demultiplexed digital data to the video decoding/capturing section 16, the audio decoding section 20, and the OSD processing section 24, respectively. Moreover, the digital data (broadcast wave signal) extracted by the demultiplexer (DMUX) 15 is, if necessary, recorded in the RAM 28 under writing control by the CPU 30.

The video decoding/capturing section 16 is configured to decode the video signal demultiplexed by the demultiplexer (DMUX) 15, and to capture, as a still image, video information contained in the video signal. The video decoding/capturing section 16 outputs the decoded video signal to the video selector section 17.

From among the video signal received inputted from the external input section 6, the video signal received via the analog broadcast antenna 9, and the video signal received via the digital broadcast antenna 10, the video selector section 17 selects a signal to be outputted therefrom, and switch over the output therefrom. The switching-over is carried out according to a control instruction from the CPU 30. The video signal thus selected is outputted to the image processing section 18.

The video processing section 18 is configured to perform image processing (such as noise reduction, sharpness adjustment, contrast adjustment etc. for example) to the video signal inputted from the video selector section 17, thereby converting the video signal into video signal displayable in an appropriate form on the liquid crystal display device 7. The video processing section 18 outputs the post-image processing video data to the display control section 19. Moreover, as described later, the image processing section 18 is also configured to nullify the video output and cause a predetermined background color instead in response to an instruction from a combining process section 40 realized by the CPU 30. In the television broadcast receiving device 1 according to the present embodiment, the predetermined background color is block (black screen).

The display control section 19 is configured to supply the liquid crystal display device 7 with the video data inputted in the display control section 19, and control the liquid crystal display device 7 to display the video data. Moreover, the control section 19 is also capable of controlling the liquid crystal display device 7 to display a screen in which an OSD plane for an electronic program guide, a subtitle, text broadcast, or the like, and an image plane based on the video data are superimposed with each other.

The audio decode section 20 is configured to decode the audio signal demultiplexed by the demultiplexer (DMUX) 15. The audio decode section 20 outputs the decoded audio signal to the audio selector section 21.

From among the audio signal inputted from the external input section 6, the audio signal received via the analog broadcast antenna 9, the audio signal received via the digital broadcast antenna 10, the audio selector section 21 selects an audio signal to be outputted therefrom, and switches over the output therefrom. The switching-over is carried out according to a control instruction from the CPU 30. The audio signal thus selected is outputted to the audio output control section 22. The audio output control section 22 is configured to receive the audio signal and convert the audio signal into a form in which the speaker 8 can output. Then, the audio output control section 22 sends the converted audio signal to the speaker 8.

The OSD processing section 24 is configured to create an electronic program guide on the basis of EPG data stored and updated regularly in the RAM 28. Moreover, the OSD processing section 24 is also configured to create OSD display data on the basis of image data for OSD display (OSD plane data; which is stored in advance in the RAM 28, a ROM (not illustrated), or a volatile memory (not illustrated)) or on the basis of image data created by operating software or a processing circuit.

The OSD plane data may be stored in advance in the RAM 28, the ROM (not illustrated), or the volatile memory (not illustrated), or may be created at need by software or a processing circuit as described above. According to the OSD plane data, an image of various information such as, for example, setting menu screen, sound volume gage, current time, tuned channel, etc. can be formed. Moreover, under instruction of the CPU 30, the OSD processing section 24 also determines layout or the like of the various information whose image is to be formed on the display screen of the liquid crystal display device 7.

Moreover, as described later in more detail, the OSD processing section 24 is also configured to combine different OSD planes under instruction of the combining process section 40 realized by the CPU 30.

The OSD display data outputted from the OSD processing section 24 is superimposed on the image data by an adder circuit 26, the image data being supplied from the image processing section 18. Then, the OSD display data and the image data thus combined are supplied to the display control section 19.

The remote controller's light beam receiving section 25 is configured to receive an optical signal from a remote controller 5, thereby receiving a control instruction from the remote controller. The control instruction thus received is sent to the CPU 30.

The communication control section 27 is configured to perform control for establishing communication with an external apparatus via a network (such as a telephone line, LAN, the Internet), or HDMI (High Definition Multimedia Interface) cable or the like. It should be noted that the communication may be established with the external apparatus via a connection medium other than the network or HDMI cable described above.

RAM 28 is a memory device using a semiconductor element. The RAM 28 is configured to store therein EPG data received via a broadcast wave, the OSD image data read out by the OSD processing section 24, and the like data.

The CPU 30 is configured to perform various control of the sections provided to the television broadcast receiving device 1. The CPU 30 can realize various functions by reading out and executing a main program stored in the RAM 28.

(Software Configuration of Television Broadcast Receiving Device)

Next, a software configuration according to the combining process for superimposing a plurality of OSD planes is described below, referring to FIG. 1. FIG. 1 illustrates one embodiment of the present invention and is a block diagram for illustrating a software configuration, which a television broadcast receiving device has for the combining process. For the sake of easy explanation, what are illustrated in FIG. 1 are the image processing section 18, the OSD processing section 24, the adder circuit 26, the video output converting section 19, and the RAM 28 only, which are sections relating to the combining process among the sections illustrated in FIG. 4.

Figure 3:
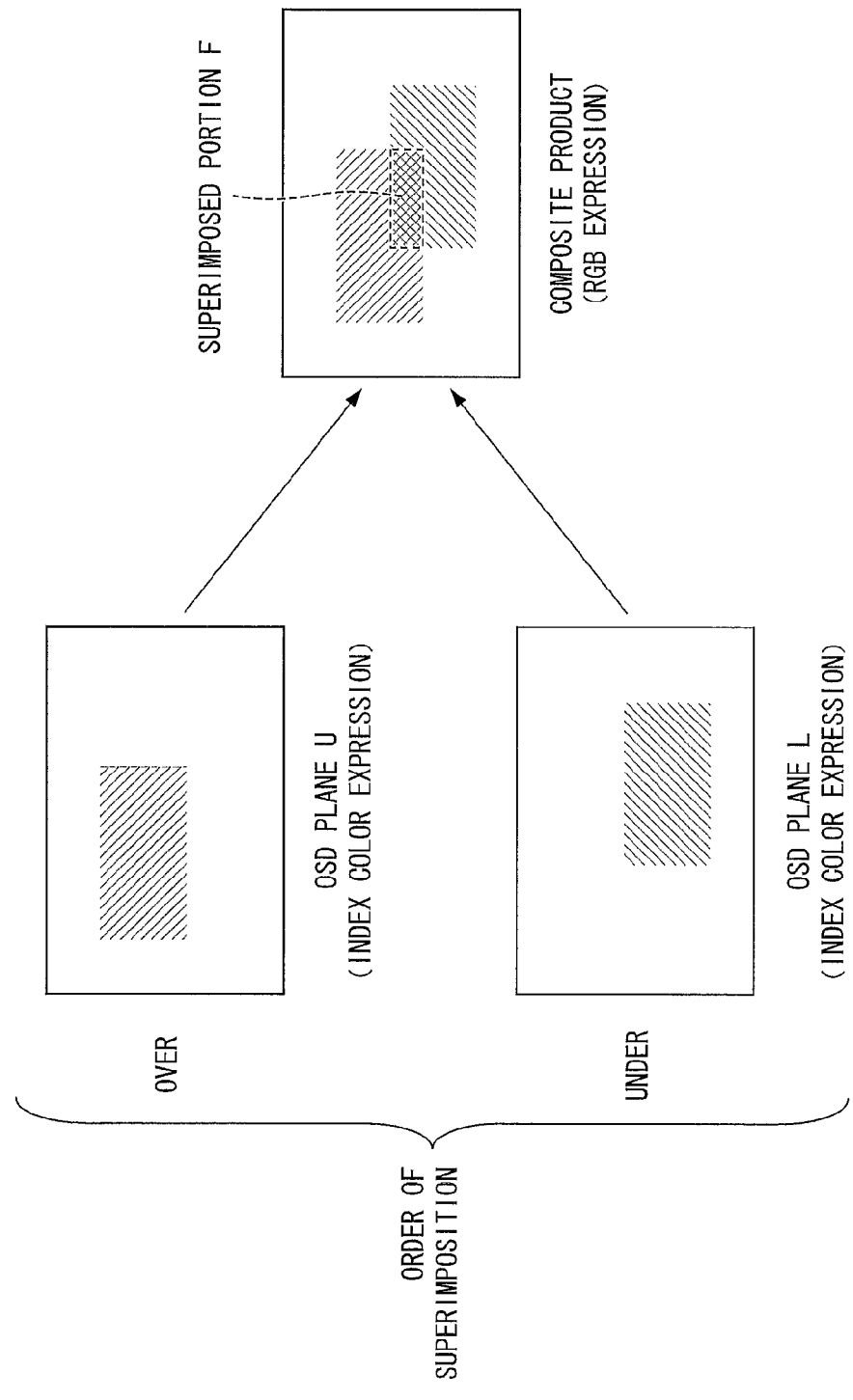
FIG. 3 is a view of a conventional art and illustrates a composite product synthesized by superimposing the different OSD planes U and L expressed in the index color expression and converted to the RGB expression.

Moreover, one of the superimposed OSD planes which is on its counterpart is referred to as an OSD plane U (second display screen) and the other one of the superimposed OSD planes which is under its counterpart is referred to an OSD plane L (first display screen). Moreover, the OSD plane U is an OSD plane for displaying graphic figure having a predetermined shape (for example, a rectangular shape in FIG. 2 or 3). The OSD plane L is an OSD plane for performing a fading process for the image. The OSD plane L is mono-colored for a fading process to an image. The OSD plane L is configured to reduce or increase its transmittance over a predetermined time period. Here, the present embodiment explains the case where the OSD plane L reduces its transmittance, that is, the case of fading out. Moreover, the OSD plane synthesized by superimposing the OSD plane U and the OSD plane L is referred to as an OSD plane C (composite screen) herein.

As described above, the transmittance of the OSD plane L is changed and a color(s) of the OSD plane U superimposed with the OSD plane L is consequently changed in accordance with the change of the transmittance in the OSD plane L. In the television broadcast receiving device 1 according to the present embodiment performs the following superimposing process in order to express the color change in the OSD plane U.

As illustrated in FIG. 1, the software configuration of the television broadcast receiving device 1 for executing the superimposing process includes, as its functional blocks, the combining process section (creating means) 40, an index color obtaining section (look-up table creating means) 42, a fading start instructing section (changing means) 43, a color updating section (updating means) 44, a synthesis instructing section 45, and an image replacing instructing section (replacing means, display changing means) 46. The combining process section 40 is realized by the CPU 30. The CPU 30 realizes the functional block by reading out and executing a program (not illustrated) from the RAM. Moreover, the creating means of the present invention includes the combining process section 40 and the OSD process section 24.

Moreover, in an initial state, the RAM 28 stores therein OSD plane U data 51 and OSD plane L data 52. The OSD plane U data 51 and the OSD plane L data 52 are data for OSD display of the OSD plane U and for OSD display of OSD plane L, respectively. That is, the OSD plane U data 51 and the OSD plane data 52 are data on characters, graphical figures, backgrounds, and/or the like, and are stored in the RAM 28 on a pixel basis. Each pixel of the OSD plane U data 51 and the OSD plane data 52 is numbered by index numbers, so that actual color expression is allotted to each pixel in the display operation, referring to a look-up table for the indexes and color codes.

Accordingly, the RAM 28 is configured to store therein an OSD plane U index color (second look-up table) 53 and an OSD plane L index color (first look-up table) 54, which are index look-up tables for determining pixel colors of the OSD plane U data 51 and the OSD plane L data 52.

In the television broadcast receiving device 1 according to the present embodiment, the index look-up tables (OSD plane index colors) associate each index code with integer values for R, G, B, and α out of 0 to 255. One concrete example of the OSD plane U index color 53 is illustrated in FIG. 5(a). That is, for each index code associated with each pixel, the R, G, B, and α values are set. Moreover, because the OSD plane U is not mono-colored, so that each of its index codes (index codes 0 to 64) is set as to the R, G, B, and α values.

On the other hand, the OSD plane L index color 54 is mono-colored, so that only one color (index code 255) is set as to the R, G, B, and α values as illustrated in FIG. 5(b). In case where the OSD plane L index color 54 has a part in which the fading effect is effected and another part in which the fading effect is not effected, for example, in case where the fading effect is to partially fade the image, the OSD plane L index color 54 needs at least two colors. In such a case, the OSD plane L index color 54 is not mono-colored as in FIG. 5(a), and has index codes for two or colors to which the R, G, B, and α values are respectively set.

FIG. 5 illustrate one embodiment of the present invention, and FIG. 5(a) is a view illustrating one example of index colors for OSD plane U index color 53. Moreover, FIG. 5(b) illustrates one embodiment of the present invention, and is a view illustrating one example of index colors for OSD plane L index color 54.

The number of the index codes that are set in the OSD plane U index color 53 and the OSD plane L index color 54 are determined as appropriate based on what is to be displayed on the OSD display in the OSD plane U and OSD plane L, and which kind of hardware configuration the television broadcast receiving device 1 has.

The index color obtaining section 41 is configured to obtain color information from the OSD plane U index color 53 and the OSD plane L index color 54, and create an OSD plane C index color 55 therefrom. More specifically, to the index codes 0 to 64, the index color obtaining section 41 copies the color information obtained from the OSD plane U index color 54, as illustrated in FIG. 6. The index color obtaining section 41 leaves the index codes 65 to 254 as unused area. For the index code 255, the index color obtaining section 41 copies the color information obtained from the OSD plane L index color 53. In this way, the index color obtaining section 41 obtains the color information from the OSD plane U index color 53 and the OSD plane L index color 54, and creates the OSD plane C index color (third look-up table) 55 therefrom. Then, the index color obtaining section 41 instructs the fading start instructing section 43 to start execution of the fading effect in the OSD plane C.

Figure 8:
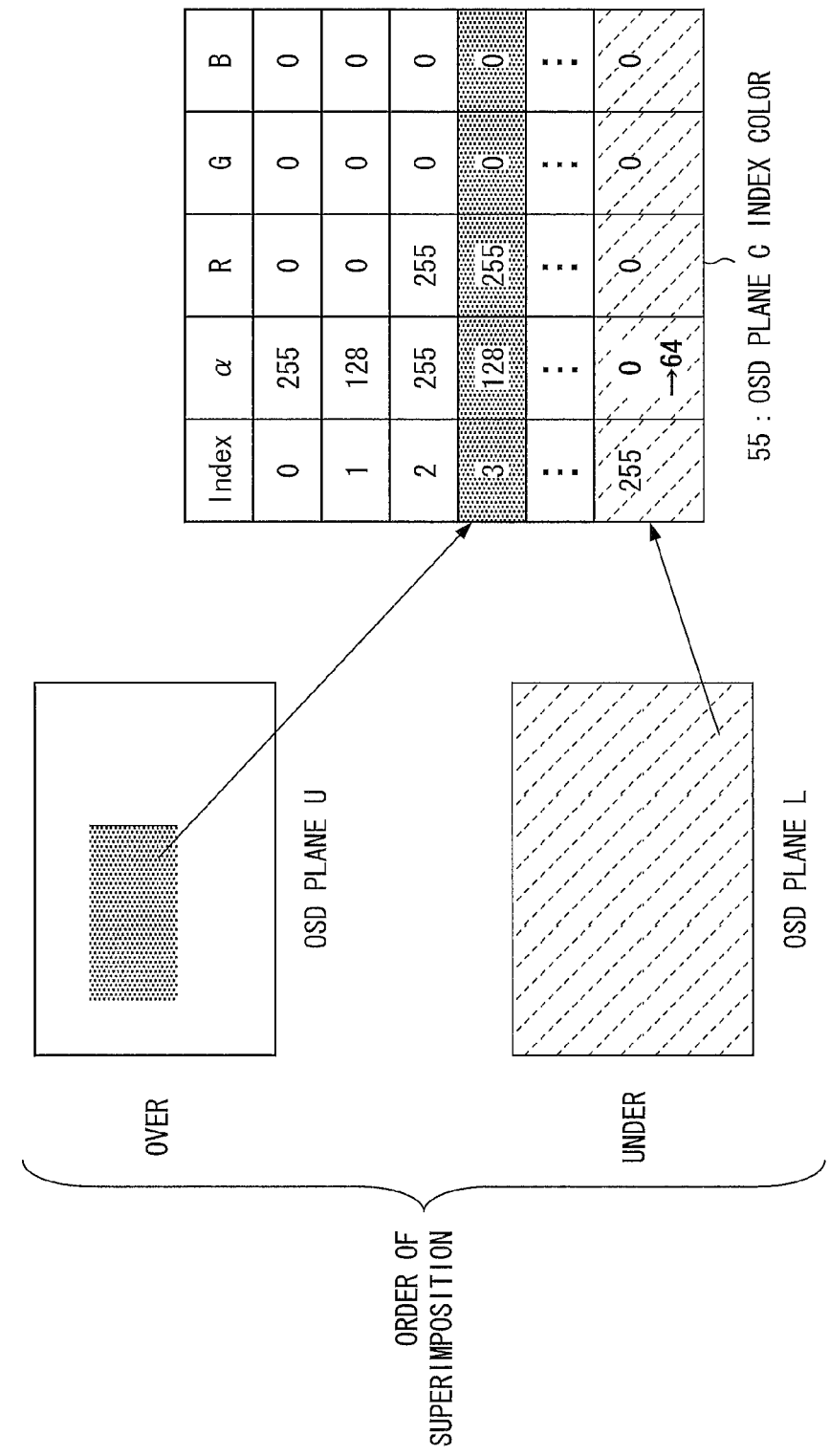
FIG. 8 is a view illustrating one embodiment of the present invention and illustrates one example of changing α value for an index code 255 by a fading start instructing section.

The fading start instructing section 43 is configured to start execution of the fading effect in the OSD plane C under instruction of the index color obtaining section 41. Here, the OSD plane C is an OSD plane synthesized by combining the OSD plane L and the OSD plane U. Moreover, the OSD plane L is for effectuating the fading effect. In order to effect the fading effect in the OSD plane C, the fading start instructing section 43 changes the α value of the OSD plane L, where the α value of the OSD plane L is indicative of the transmittance of the OSD plane L. More specifically, in case where an index code for a pixel in the OSD plane U is index 3, and an index code for a pixel in the OSD plane L is index 255 as illustrated in FIG. 8, the fading start instructing section 43 changes the α value of index code 255 from, for example, 0 to 64. Note that, in the present embodiment, the larger the α value, the smaller the transmittance. In other words, the larger the α value, the larger the opacity. FIG. 8 is a view illustrating one embodiment of the present invention and illustrates one example of changing the α value for an index code 255 by the fading start instructing section 43.

The fading start instructing section 43 changes the α value indicative of the transmittance of the OSD plane L, and outputs, to the color updating section 44, information on the changed α value.

The color updating section 44 is configured to calculate, from the following Equations (7) to (10), the α, R, G, and B values of the OSD plane U according to the changed α value of the OSD plane L, which α value outputted from the fading start instructing section 43, and to update the value of the OSD plane C index color with the α, R, G, and B values thus calculated out.

Here, how to obtain Equations (7) to (10) is explained.

Assume a screen display D is a display state in which the OSD planes U and L, and the image plane B are totally superimposed. Then, colors (Red, Green, Blue) of the pixel p of the screen display D can be expressed in $d_r$, $d_g$, and $d_b$. Further assume that $u_r$, $u_g$, $u_b$, and $u_\alpha$ are colors (Red, Green, Blue, and α (opacity)) of a pixel p of the OSD plane U, and $u_\beta = 1 - u_\alpha$. Further assume that $l_r$, $l_g$, $l_b$, and $l_\alpha$ are colors (Red, Green, Blue, and α (opacity)) of the pixel p of the OSD plane L, and $l_\beta = 1 - l_\alpha$. Further assume that $c_r$, $c_g$, $c_b$, and $c_\alpha$ are colors (Red, Green, Blue, and α (opacity)) of the pixel p of the OSD plane C, and $c_\beta = 1 - c_\alpha$. Further assume that $b_r$, $b_g$, and $b_b$, are colors (Red, Green, Blue) of the pixel p of the image plane B.

Under these assumptions, the color of the pixel p in the display screen D synthesized by superimposing the OSD planes U and L, and the image plane B can be calculated out from the following Equations (1) to (3).

$$d_r = u_\beta(l_\beta b_r + l_\alpha l_r) + u_\alpha u_r \quad (1),$$

$$d_g = u_\beta(l_\beta b_g + l_\alpha l_g) + u_\alpha u_g \quad (2),$$

$$d_b = u_\beta(l_\beta b_b + l_\alpha l_b) + u_\alpha u_b \quad (3).$$

On the other hand, the color of pixel p in the display screen D synthesized by superimposing the image plane C and the OSD C plane synthesized by combining the OSD planes U and L can be calculated out from the following Equations (4) to (6).

$$d_r = c_\beta b_r + c_\alpha c_r \quad (4),$$

$$d_g = c_\beta b_g + c_\alpha c_g \quad (5),$$

$$d_b = c_\beta b_b + c_\alpha c_b \quad (6).$$

By comparing the two groups of equations (the group of Equations (1) to (3) and the group of Equations (4) to (6)), it is possible to obtain the following Equations (7) to (10) for calculating out the color of the pixel p of the OSD plane C from the colors of the pixel p of the OSD planes U and L.

$$c_\alpha = 1 - u_\beta l_\beta \quad (7),$$

$$c_r = (u_\beta l_\alpha l_r + u_\alpha u_r)/c_\alpha \quad (8),$$

$$c_g = (u_\beta l_\alpha l_g + u_\alpha u_g)/c_\alpha \quad (9),$$

$$c_b = (u_\beta l_\alpha l_b + u_\alpha u_b)/c_\alpha \quad (10)$$

Note that Equations (7) to (10) are equations for one pixel p in the OSD plane C. The OSD planes U, L, C are in the index color expression, and OSD plane L is mono-colored. Therefore, Equations (7) to (10) can be considered as equations representing relationship between the color, expressed in the index color expression, of the OSD plane U and the color, expressed in the index color expression, of the OSD plane C. Thus, once the color of the OSD plane L is determined, the color, expressed in the index color expression, of the OSD plane U is converted into the color, expressed in the index color expression, of the OSD plane C by using Equations (7) to (10). Therefore, the synthesis of the OSD plane C is carried out by causing the OSD plane C to have the graphical figure formed on the OSD plane U, and determining the color of the graphical figure from calculation of Equations (7) to (10). By this, the OSD plane C can look in the same way as the superimposition of the OSD plane U and the OSD plane L.

Figure 9:
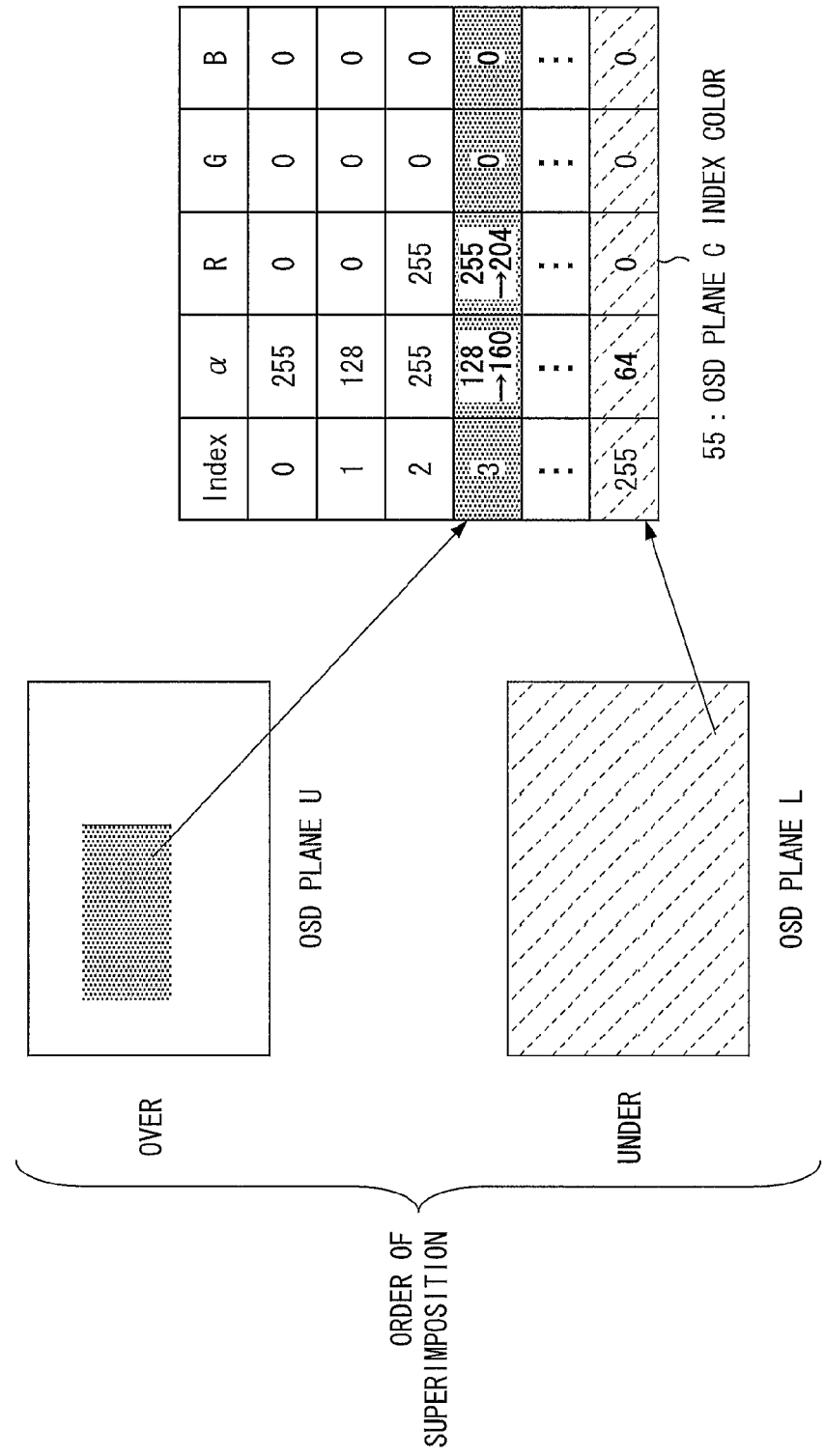
FIG. 9 is a view illustrating one embodiment of the present invention and illustrates one example of a result of updating values of an index color portion of the OSD plane U.

In the present embodiment, the OSD plane L is provided for giving the fading effect on an image. Thus, the present embodiment is configured such that the OSD plane L is in black, and the color updating section 44 changes the α value from 0 to 255, where the α value indicates the transmittance of the OSD plane L. Moreover, the color updating section 44 changes the index color portion of the OSD plane U according to the change in the α value. More specifically, as illustrated in FIG. 9, the fading start instructing section 43 changes, from 0 to 64, that portion of the OSD plane C index color 55 which corresponds to the index color (index code 255) of the OSD plane L. Then, the color updating section 44 changes the α, R, G, and B values of a portion corresponding to the index color (index code 3) of the OSD plane U by using Equations (7) to (10). In FIG. 9, the α value of the index code 3 is changed from 128 to 160, and the R value of the index code 3 is changed from 255 to 204. In this way, the color updating section 44 updates the OSD plane C index color 55. FIG. 9 is a view illustrating one embodiment of the present invention and illustrates one example of a result of updating the values of the index color portion of the OSD plane U.

Figure 10:
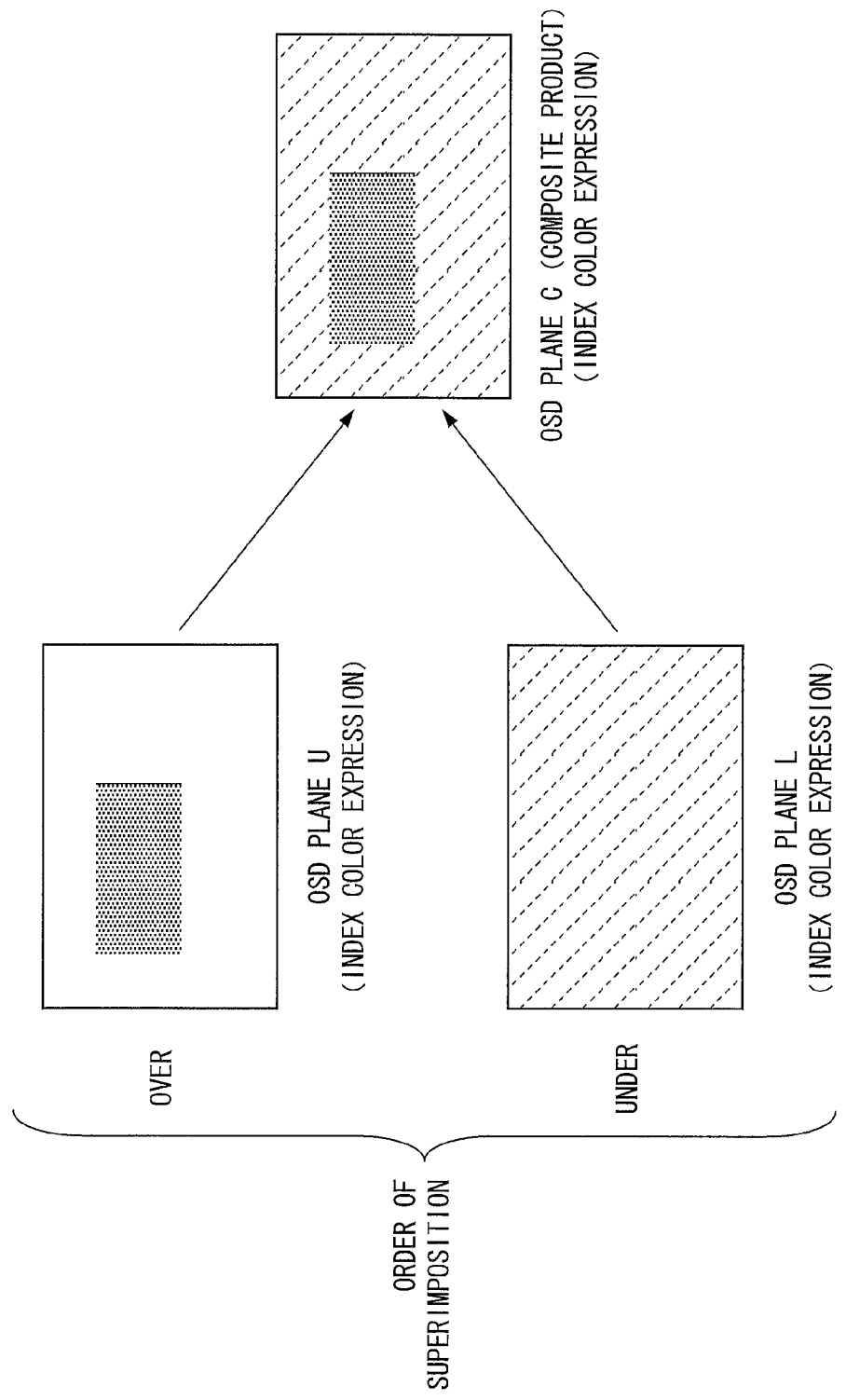
FIG. 10 is a view illustrating one embodiment of the present invention and illustrates one example of synthesizing an OSD plane C by combining an OSD plane U and OSD plane L in index color expression.

After the color updating section 44 updates the OSD plane C index color 55, the synthesis instructing section 45 instructs the OSD processing section 24 to synthesize the OSD plane C based on the updated OSD plane C index color 55. Under instruction of the synthesis instructing section 45, the OSD processing section 24 reads out the OSD plane U data 51 and the OSD plane L data 52 from the RAM 28, and synthesize the OSD plane C therefrom referring to the OSD plane C index color 55. More specifically, the synthesis of the OSD plane C is carried out by combining, as illustrated in FIG. 10, the OSD plane U, and the OSD plane L with the updated index colors in such a way that the OSD plane U in the index color expression and the OSD plane L in the index color expression are combined. Then, the synthesis instructing section 45 causes the adder circuit 26 to superimpose the OSD plane C thus synthesized and the image outputted from the image processing section 18, and to output to the display control section 19 a product of the superimposition. FIG. 10 is a view illustrating one embodiment of the present invention and illustrates one example of synthesizing the OSD plane C by combining an OSD plane U and OSD plane L in the index color expression.

Figure 11:
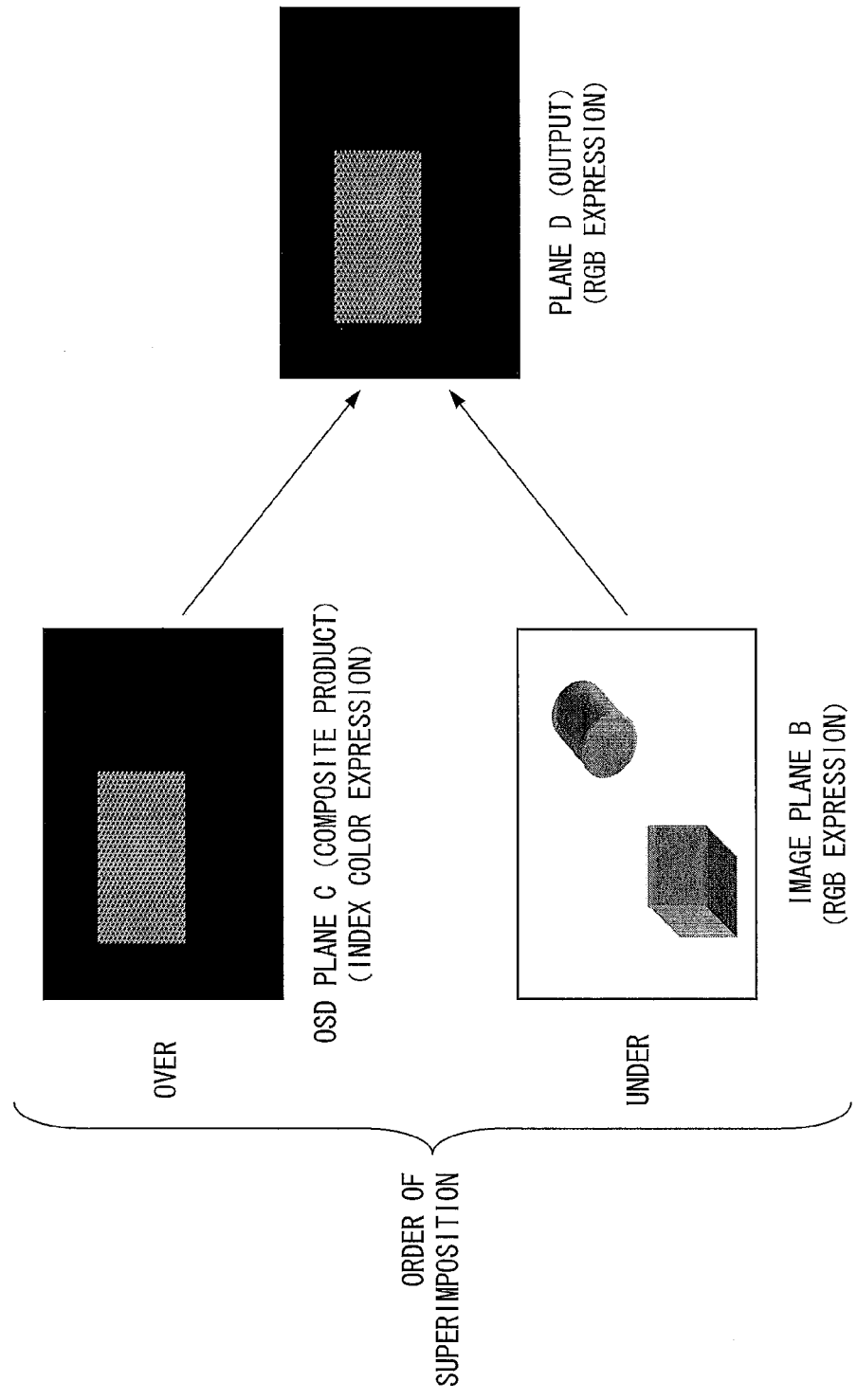
FIG. 11 is a view illustrating one embodiment of the present invention and illustrates one example of obtaining a plane D for output, which plane D is obtained by superimposing the OSD plane C and an image plane B.

The display control section 19 converts into an electronic signal the product (plane D for output) of the superimposition of the image (image plane B) and the OSD plane C as illustrated in FIG. 11, and outputs the electronic signal to the liquid crystal display device 7. FIG. 11 is a view illustrating one embodiment of the present invention and illustrates one example of obtaining the plane D for output, which plane D is obtained by superimposing the OSD plane C and the image plane B.

After the desired updating of the OSD plane C by the color updating section 44 and the synthesis instructing section 45 is completed, the synthesis instructing section 45 notifies the image conversion instructing section 46 of the completion of the process of the fading effect. Here, what is meant by the completion of the desired updating of the OSD plane C is, for example in case of the fading-out process, completion of the color updating section 44 updating the OSD plane C index color 55 so that the image of the OSD plane C is gradually darkened within a predetermined time period.

In response to the notification from the synthesis instructing section 45, the image conversion instructing section 46 instructs the image processing section 18 to display an image after completion of the fading effect, and rewrites the OSD plane C index color 55 back into the initial state of the OSD plane C index color 55.

Here, the display after the completion of the fading effect is a totally black display state when the fading-out effect is carried out as the fading effect. That is, in the present embodiment, the display state of the image is subjected to the fading effect by changing the display of the OSD plane C. That is, the display of the image itself was not changed. Moreover, it is necessary to return the OSD plane C index color 55 to its initial state so that the OSD plane C index color 55 can be used for new display of the OSD plane C. If the OSD plane index color 55 was returned to its initial state right after the completion of the fading-out process, the image displayed on the liquid crystal display device 7 would be returned to the state before the fading-out process. Therefore, as illustrated in FIG. 13, the display after the completion of the fading-out process is maintained by maintaining in the image plane B in the display state after the completion of the fading-out process, that is, by nullifying the image output so as to display a black screen. The image conversion instructing section 46 obtains respectively from the OSD plane U index color 53 and the OSD plane L index color 54 the R, G, B, and α values for the corresponding index codes. Then, by using the values thus obtained, the image conversion instructing section 46 returns the OSD plane C index color 55 from the state after the completion of the fading-out to the initial state.

FIG. 13 is a view illustrating, the OSD plane C, the image plane B, and a composite product synthesized therefrom, wherein the OSD plane C is in a state to display in its initial display and the image plane B is in a state to display a black screen display.

(Process Flow of Combining Process of OSD Planes)

Figure 14:
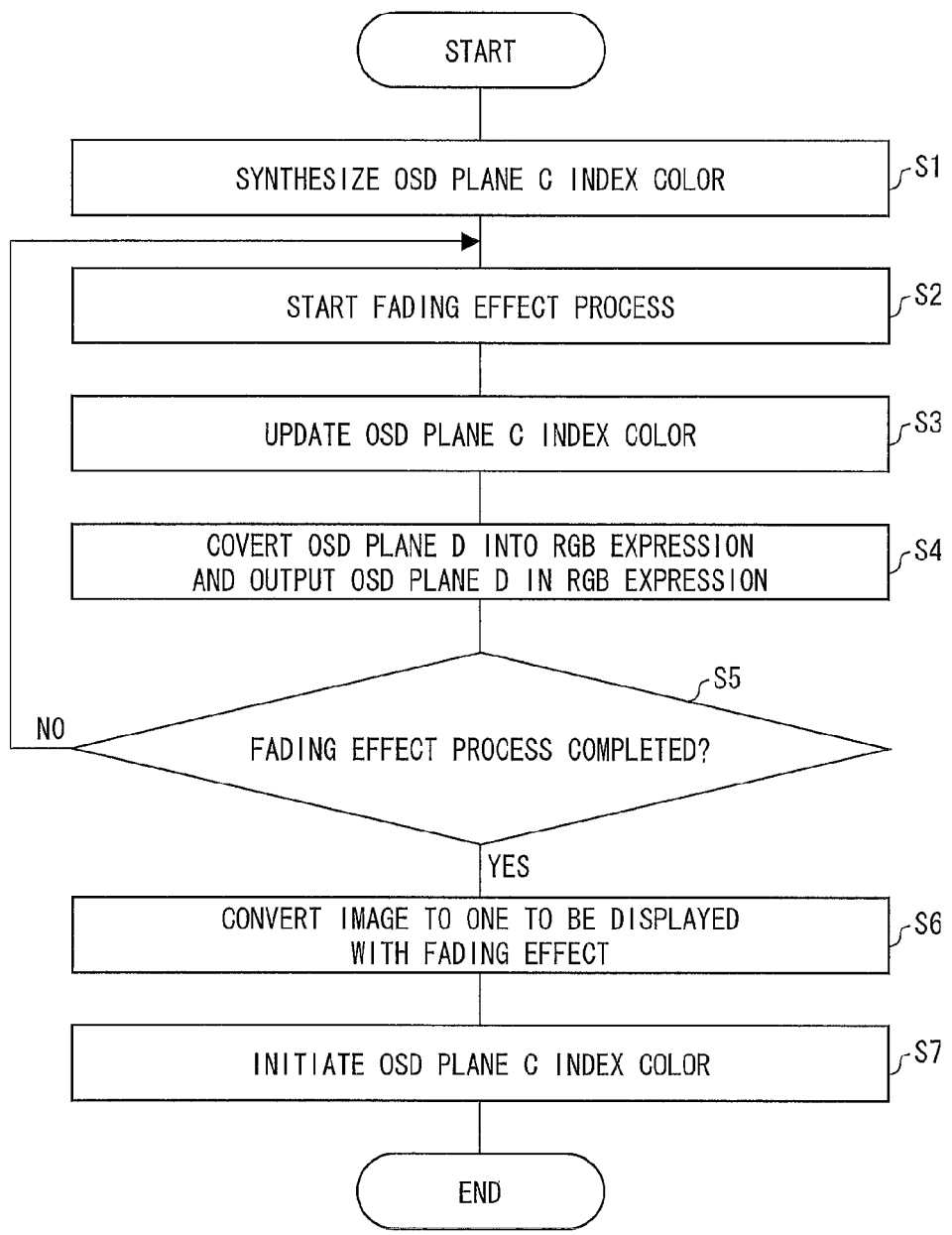
FIG. 14 illustrates one embodiment of the present invention, and is a flowchart to illustrate one example of a process flow of a combining process for OSD planes.

Next, a process flow of a combining process of OSD planes in the television broadcast receiving device 1 having the aforementioned configuration is described below, referring to FIG. 14. FIG. 14 illustrates one embodiment of the present invention, and is a flowchart to illustrate one example of a process flow of a combining process for OSD planes.

Assume that the television broadcast receiving device 1 according to the present embodiment is configured to combine the image plane B with the OSD planes U and L, and display a composite screen thus obtained, so that an image (image plane B) is displayed with a display effect obtained by combining the OSD planes U and L. The television broadcast receiving device 1 according to the present embodiment is configured to combine the OSD plane C and the image plane B. It should be noted that the television broadcast receiving device 1 is configured to synthesize an OSD plane C by combining the OSD planes U and L in advance, before combining the image plane B with the OSD planes U and L, and then to combine the image plane B with the OSD plane C.

The OSD plane U is an OSD plane (e.g., menu screen, etc.) for displaying a graphical figure etc. for showing a predetermined information to the a user, and the OSD plane L is an OSD for giving a fading effect to the image plane B. Herein, the process flow of the combining process is explained, referring to an example in which a fading-out process is carried out as the fading effect. Moreover, the OSD plane L is for giving the fading effect to the image plane B, and therefore, is wholly mono-colored with a predetermined color. In the present embodiment, the predetermined color is black. The OSD plane L is configured to reduce transmittance of the black color at a constant rate within a predetermined time period. In the present embodiment, the OSD plane U to be superimposed with the OSD plane L is configured such that the OSD plane U also changes the color in accordance with the change in the transmission of the OSD plane L.

Further assume that the television broadcast receiving device 1 is configured such that the RAM 28 stores pallets (the OSD plane U index color 53, the OSD L index color 54, and the OSD plane C index color 55) for the OSD planes U, L, and C.

Under these assumptions, the television broadcast receiving device 1 according to the present embodiment performs the combining process for the OSD planes U and L as follows.

Firstly, the index color obtaining section 41 obtains color information from the OSD plane U data 51 and the OSD plane 1 data 52. More specifically, the index color obtaining section 41 obtains color information of all the index codes in the OSD plane U index color 53. Furthermore, the index color obtaining section 41 obtains color information of the index codes only on black in the OSD plane L index color 54. That is, the OSD plane L is expressed only in black and the OSD plane expressed in black is to be changed only in the transmission thereof. Thus, the index color obtaining section 41 obtains only the color information of the index codes only on black in the OSD plane L index color 54. Then, the index color obtaining section 41 synthesizes the OSD plane C index color 55 from the color information obtained from the OSD plane L index color 53 and the OSD plane L index color 54 (Step S1, hereinafter referred to as S1). The obtaining process for obtaining the color information from the OSD plane U data 51 and the OSD plane L data 52 by the index color obtaining section 41 may be triggered, for example, according to a display instruction inputted by a user by using the remote controller 5. The trigger of the obtaining process for obtaining the color information is not limited to this. For example, it may be configured such that OSD planes L and U are displayed in superimposition with an image plane B in case where reception of a broadcast wave is interrupted by a weather condition or the like. In this case, the trigger of the obtaining process of the color information is a detection result that indicates poor reception of the broadcast wave.

After the synthesis of the OSD plane C index color 55, the index color obtaining section 41 instructs the fading start instructing section 43 to start the fading effect process to the OSD plane C.

The fading start instruction section 43, which receives the instruction of starting the fading effect process from the index color obtaining section 41, starts the fading effect process to the OSD plane C (S2). More specifically, the fading start instructing section 43 changes the α value indicative of the transmittance of the OSD plane L in order to provide the fading effect to the OSD plane C. More specifically, as illustrated in FIG. 8, assuming the index code corresponding to a pixel in the OSD plane L is index 255, the fading start instructing section 43 changes the α value of the index code 255, for example, from 0 to 64.

After changing the α value indicative of the transmittance of the OSD plane L, the fading start instructing section 43 sends, to the color updating section 44, information regarding the changed α value.

According to the changed α value of the OSD plane L from the fading start instructing section 43, the color updating section 44 determines the α, R, G, and B values of the color information obtained from the OSD plane U, and updates the values of the OSD plane C index color (S3). More specifically, according to the changed α value of the OSD plane L from the fading start instructing section 43, the color updating section 44 changes, as illustrated in FIG. 9, the α value from 128 to 160, and the R value from 255 to 204, thereby updating the OSD plane C index color 55.

After the color updating section 44 updates the OSD plane C index color 55, the synthesis instructing section 45 instructs the OSD processing section 24 to synthesize an OSD plane C based on the updated OSD plane C index color 55. Under instruction of the synthesis instructing section 45, the OSD processing section 24 reads out from the RAM 28 the OSD plane U data 51 and the OSD plane L data 52, and synthesizes the OSD plane C, referring to the OSD plane C index color 55. More specifically, the synthesis of the OSD plane C is carried out by combining, as illustrated in FIG. 10, the OSD planes U and L in the index color expression, whose index colors have been updated.

The synthesis instructing section 45 causes the adder circuit 26 to superimpose the OSD plane C thus synthesized and an image outputted from the image processing section 18. Then, the synthesis instructing section 45 outputs the product of superimposition of the OSD plane C and the image to the display control section 19. As illustrated in FIG. 11, the display control section 19 converts the product (output plane D) of superimposition of the OSD plane C and the image into an electronic signal and outputs the electronic signal to the liquid crystal display device 7 (S4).

The process from Steps S2 to S4 is repeated until the fading effect process is completed, that is, until the synthesis instructing section 45 decides as "Yes" at decision making at Step S5. More specifically, timing of the output from the OSD processing section 24 to the adder circuit 26 is synchronized with image updating cycles in the liquid crystal display device 7. Therefore, the fading start instructing section 43 changes the α value of the index code 255 in synchronism with the timing of the image display updating stepwise at a predetermined rate until the α value of the index code 255 reaches 255. Every time the α value is changed, the process from Step S3 to S5 is repeated.

When the α value of the index code 255 reaches 255, the fading start instructing section 43 notifies the synthesis instructing section 45 via the color updating section 44 that the α value of the index code 255 has reached 255. When the synthesis instructing section 45 receives the notification from the fading start instructing section 43, the synthesis instructing section 45 notifies the image conversion instructing section 46 that the fading effect is completed.

Figure 12:
FIG. 12 is a view illustrating one embodiment of the present invention and illustrates copy data and OS plane C index color at completion of a fading-out process.

In response to the notification from the synthesis instructing section 45, the image conversion instructing section 46 instructs the image processing section 18 to display the image with the fading effect (S6). Further, the image conversion instructing section 46 initializes the OSD plane C index color 55 by rewriting the OSD plane C index color 55 to its initial state as illustrated in FIG. 12 (S7). The present embodiment is explained based on the fading-out process as an example. Thus, the image display after the completion of the fading effect is a black display herein. Therefore, the image processing section 18 nullifies the image output so as to display the image plane B as a black screen, as illustrated in FIG. 13.

In the above, described is the case where the pallets are provided with the OSD planes U, L, and C, respectively (OSD plane index color 53, the OSD index color 54, and the OSD plane C index color 55). However, the present invention is not limited to such a configuration in which the OSD planes U, L and C are provided with pallets, respectively. The present invention may be configured such that only one common pallet is provided to the OSD planes U, L and C.

In the following, the case where only one common pallet is provided to a television broadcast receiving device 1 is described. Assume that the common pallet is an OSD plane C index color 55 being identical in terms of contents with the OSD plane C index color 55 illustrated in FIG. 6.

The configuration in which the common pallet is used is different in the following points from the configuration of the television broadcast receiving device 1 illustrated in FIG. 1.

That is, on the contrary to the configuration in which the index color obtaining section 41 obtains the color information of the OSD plane U and the color information of the OSD plane L from the OSD plane U index color 53 and the OSD plane L index color 54, respectively, and synthesizes the OSD plane C index color 55 therefrom, the configuration in which a common pallet is used is such that, as to the OSD plane C index color 55, an index color obtaining section 41 deals with index codes for the color information of the OSD plane U and index codes for the color information of OSD plane L stored in the RAM 28.

Moreover, the configuration in which a common pallet is used is different from the aforementioned configuration in that an index color copying section (copying means; not illustrated) for copying the OSD plane C index color 55 as illustrated in FIG. 7. That is, the index color copying section is configured to, under instruction of the index color obtaining section 41, store a copy of the OSD plane C index color 55 in another region in the RAM 28 as copy data 56. More specifically, as illustrated in FIG. 7, the index color copying section stores the same contents as the OSD plane C index color 55 in another storage region in the RAM 28 as the copy data (duplicate data) 56. After the copy data 56 is stored in the RAM 28, the index color copying section 42 instructs a fading start instructing section 43 to start a fading effect process to the OSD plane C.

Moreover, an image conversion instructing section 46 uses a different method for returning the OSD plane C index color 55 after completion of the fading-out process. That is, in this configuration in which the television broadcast receiving device 1 is provided with one common pallet, the image conversion instructing section 46 initiates the OSD plane C index color 55 by returning the contents of the OSD plane C index color 55 to the contents of the copy data 56, as illustrated in FIG. 12. FIG. 12 is a view illustrating one embodiment of the present invention and illustrates copy data 56 and the OS plane C index color 55 at completion of a fading-out process.

Compared with the configuration in which one common pallet is provided to the OSD planes L, U, and C, the configuration in which the pallets are provided to the OSD planes L, U, and C, respectively has such advantages that it can be realized by simple combinations of process, and thus can be easily implemented, but has such a disadvantage that it requires a larger amount of data to be stored in the RAM 28.

As illustrated above, the television broadcast receiving device 1 is capable of outputting the OSD planes U and L (display screens displayed by the OSD function, that is, 2-dimensional plane regions for image formation for the OSD display) and the image plane B (2-dimensional plane region for image formation for an image) in superimposition with each other.

The television broadcast receiving device 1 is capable of synthesizing the OSD plane C as a composite screen in the index color expression by combining the OSD planes U and L in the index color expression in such a manner that the OSD planes U and L, in which each pixel color is indicated by the color codes of red, green, and blue selected and combined as necessary, are combined so that the display effect obtained by the superimposition of the OSD plane U and the OSD plane L can be attained. Further, the television broadcast receiving device 1 is configured such that the OSD plane U data 51, the OSD plane L data 52, and the OSD plane C index color 55 necessary for the image formation in the OSD plane C thus synthesized is read out from the RAM 28, and the display control section 19 can output to the liquid crystal display device 7 an image in which the OSD plane C is superimposed with the image plane B.

Therefore, in order to output the OSD plane U and the OSD plane L in superimposition with the image plane B, the OSD plane C in which the OSD planes U and L are superimposed with each other to attain the display effect obtained by the superimposition can be synthesized before superimposing the OSD plane U and the OSD plane L with the image plane B.

Thus, as to data to read out, the display control section 19 is only required to read out the OSD display data for image formation of the OSD plane C via the OSD processing section 24, and the OSD display data for image formation of the image plane B via the image processing section 18. Compared with the configuration in which the OSD display data for the OSD plane U, the OSD display data for the OSD plane L, and the image data of the image plane B are concurrently read out, the above configuration requires a smaller data amount to read out, and thus can reduce the memory band width necessary for reading-out.

Moreover, the television broadcast receiving device 1 is configured such that the RAM 28 is adopted to store therein the OSD plane L index color 54 and the OSD plane U index color 53. Accordingly, the index color obtaining section 41 can read out from the RAM 28 the OSD plane L index color 54 and the OSD plane U index color 53, and synthesize the OSD plane C index color 55 therefrom.

Moreover, the fading start instructing section 43 changes the synthesized OSD plane C index color 55 such that a value therein corresponding to the α value of a predetermined color code (index code 255 in FIG. 8) in the OSD plane L index color 54 is changed. According to the change in the α value, the color updating section 44 updates the OSD plane C index color 55 such that the color expression corresponding to the color obtainable by superimposing the OSD plane L and the OSD plane U. The color updating section 44 is configured to rewrite, in the OSD plane C index color 55, the values defining the intensities of R, G, B, and the value corresponding to the α value thereof according to the α value.

Then, under the control instruction of the synthesis instructing section 45, the OSD processing section 24 can synthesize the OSD plane C, referring to the updated OSD plane C index color 55.

Consequently, the television broadcast receiving device 1 can create an OSD plane C in which the color expression of the OSD plane U has been changed to reflect the change in the transmittance of the OSD plane L thereto.

Hence, the television broadcast receiving device 1 can synthesize an OSD plane C with color expression changed according to the change in the transmittance in the OSD plane L, even if the transmittance in the OSD plane L is changed among the OSD planes U and L to be superimposed with each other.

It should be noted that the color of the OSD plane L is not limited to black, even though the television broadcast receiving device 1 according to the present embodiment is configured such that, as described above, the color of the OSD plane L is black in order to attain the fading effect. The fading effect may be realized with a color other than black, such as red or white.

Moreover, the television broadcast receiving device 1 according to the present embodiment is such that the OSD plane L is placed between the OSD plane U and the image plane B, in order to display the image with the fading effect. That is, the OSD plane U and the OSD plane L are superimposed in such a manner that the OSD plane L is below the OSD plane U. However, the positions of the OSD planes for attaining the fading effect is not limited to this. For example, it may be so arranged that the OSD plane U is mono-colored to be an OSD plane for the fading effect, and the OSD plane L is an OSD plane for an OSD display for a desired image, information, etc. By arranging such that the OSD plane U is the OSD plane for the fading effect, the fading effect can be given to the image plane and the OSD plane L, which are located below the OSD plane U.

Moreover, the television broadcast receiving device 1 according to the present embodiment is discussed based on the example in which the OSD planes U and L, but the present invention is not limited to this example in terms of the number of OSD planes to be combined together. For example, as illustrated in FIG. 15, the number of OSD planes to be combined may be three (OSD planes U, L, and M). In this case, an OSD plane C synthesized by combining the OSD planes U, L, and M is created as follows. FIG. 15 is a view illustrating one embodiment of the present invention and illustrates one example of combining three different OSD planes U, L, and M.

That is, as illustrated in FIG. 15, an OSD plane T, which is an intermediate product synthesized by combining the OSD plane L and the OSD plane M, is created from Equations (7) to (10). Then, an OSD plane C synthesized by combining the OSD plane T and the OSD plane U in reference with the relationships expressed as Equations (7) to (10). In this way, it is possible to synthesize the OSD plane C from more than 2 OSD planes.

The fading effect may be given to the image partially rather than wholly, while the aforementioned configuration is such that the fading effect is given to the image wholly. For example, a plain area as illustrated in FIG. 16 is divided into an index color area, in which Equations (7) to (10) are applied, and an area other than the index color area, so that the fading effect is given to the index color area, but not the area other than the index color area. The area other than the index color area is indicated by vertical stripes in FIG. 16. FIG. 16 is a view illustrating one embodiment of the present invention and illustrates one example of giving a fading effect to part of an image.

Moreover, in the above, the cases of the fading effect are explained, but combining the OSD planes is not limited to the fading effect. For example, by arranging such that the α value of the OSD plane L is alternatively switched over between two particular values (for example, α=100 and α=200), it is possible to realize a blinking function. The present invention is widely applicable to such display changes that the α value is dynamically changed.

Moreover, the value to be dynamically changed is not limited to the α value of the OSD plane L, but may be any of the values respectively indicating the intensities of R, G, and B. The OSD plane L may be to give such a display effect that red is changed to blue stepwise by dynamically changing the values respectively indicating the intensities of R, G, and B.

Moreover, the television broadcast receiving device 1 includes the IP broadcast tuning section 29 in its main configuration, but the television broadcast receiving device 1 may not include the IP broadcast tuning section 29. For example, a device having an IP broadcast turning section may be provided in addition to the television broadcast receiving device 1, so that IP broadcast is received via the device.

Moreover, the television broadcast receiving device 1 includes the analog tuner 11 and the digital tuner 13 in its main configuration, but the television broadcast receiving device 1 may be configured to include any one of the analog tuner 11 and the digital tuner 13.

Moreover, in the above, the OSD plane C is synthesized by combining a plurality of OSD planes (OSD planes U and L). And the OSD plane C thus synthesized is superimposed with the image plane B, so that the OSD plane C and the image plane B in superimposition is outputted. However, the plane to be superimposed with the OSD plane C is not limited to the image plane B. For example, another OSD plane other than the OSD planes U and L may be the plane to be superimposed with the OSD plane C. In such a configuration, the third display screen of the present invention corresponds to the another OSD plane.

Finally, the blocks of the television broadcast receiving device 1, especially, the index color obtaining section 41, the fading start instructing section 43, the color updating section 44, and the synthesis instructing section 45 included in the synthetic process section 40 may be constituted by hardware logic or by software by using a CPU 30 as below.

That is, the television broadcast receiving device 1 includes the CPU 30 for executing commands of a control program for realizing functions, an ROM in which the program is stored, the RAM 28 for loading the program therein, and/or a memory device (memory medium) such as memory for storing the program and various data. The object of the present invention can also be achieved by mounting to the television broadcast receiving device 1 a computer-readable storage medium containing control program code (executable program, intermediate code program, or source program) for the television broadcast receiving device 1, which is software realizing the aforementioned functions, in order for the computer (or CPU, MPU) to retrieve and execute the program code contained in the storage medium.

As described above, a receiving device according to the present invention can be described as having the following configuration. Further, a control method for controlling the receiving device can be described as including the following steps.

As described above, the image processing device according to the present invention may be configured to comprise: output means for reading out image data constituting the composite screen thus created by the creating means, and image data constituting a third display screen, which is another display screen than the first display screen and the second display screen, and for outputting an image in which the composite screen is superimposed with the third display screen.

With this configuration, it is possible to create a composite screen by combining the first display screen and the second display screen by the creating means, and to cause the output means to output the composite screen and the third display screen in such a manner that the composite screen and the third display screen are superimposed with reach other. Thus, as to data to read out, the output means is only required to read out the image data constituting the composite screen and the image data constituting the image display screen. Compared with the configuration in which image data for the first, second, and third display screens are concurrently read out, the above configuration requires a smaller data amount to read out, and thus can reduce the memory band width necessary for reading-out.

Therefore, the image processing device according to the present invention can attain a display effect obtainable by combining a plurality of OSD display images, without requiring an increase in the memory bandwidth for reading out the image data.

As described above, the image processing device according to the present invention may be configured such that the larger the α values in the first look-up table and the second look-up table, the smaller the transmittances indicated by the α values; and the changing means changes the third look-up table in such a manner that the value corresponding to the α value in the first look-up table is increased stepwise within a predetermined time period.

With this configuration, in which the value corresponding to the α value in the first look-up table is increased stepwise within a predetermined time period, it is possible to attain a so-called fading-out process in which the image display screen superimposed with the composite screen is gradually darkened.

Moreover, as described above, the image processing device according to the present invention may be configured such that the larger the α values in the first look-up table and the second look-up table, the smaller the transmittances indicated by the α values; and the changing means changes the third look-up table in such a manner that the value corresponding to the α value in the first look-up table is reduced stepwise within a predetermined time period.

With this configuration, in which the value corresponding to the value corresponding to the α value in the first look-up table is reduced stepwise within a predetermined time period, it is possible to attain a so-called fading-in process in which the image display screen superimposed with the composite screen is gradually brightened.

Moreover, as described above, the image processing device according to the present invention may be configured such that the larger the α values in the first look-up table and the second look-up table, the smaller the transmittances indicated by the α values; and the changing means changes the third look-up table in such a manner that the value corresponding to the α value in the first look-up table is alternatively switched over between predetermined two different values at predetermined time intervals.

With this configuration, in which the value corresponding to the α value in the first look-up table is alternatively switched over between predetermined two different values at predetermined time intervals, it is possible to attain a so-called blinking function to perform blinking on the image display screen superimposed with the composite screen.

As described above, the image processing device according to the present invention may be configured such that the value corresponding to the α value in the first look-up table, which value the changing means changes, is α value defining transmittance of a predetermined color code that is set as a background color of an image display screen; and the image processing device comprises: copying means for creating a copy data of the third look-up table thus created by the look-up table creating means, and for storing the copy of the third look-up table in the memory device; replacing means for, if the value corresponding to the α value in the first look-up table reaches its maximum value, replacing, with contents of the copy data, contents of the third look-up table thus updated by the updating means updating in association with the change in the value corresponding to the α value in the first table by the changing means; and display changing means for nullifying display content of the image display screen and for changing a display state to be colored according to the predetermined color code.

What is meant by "the value corresponding to the α value in the first look-up table reaches its maximum value" is a state in which the first display portion in the composite screen is displayed in a background color (e.g., black) of the image screen that is not transparent. In such a state, the image display screen is covered with the predetermined background color in its portion where the image display screen is superimposed with the composite screen.

With this configuration, in which the copying means is provided, it is possible to store in the memory device the copy data as the information of the initial state that is prior to the updating of the third look-up table.

Further, because the replacing means and the display changing means are provided, it is possible to initialize the updated third look-up table, that is, to return the third look-up table to as state in which the image display screen is displayed with the composite screen being transparent, and it is possible to cause the image display screen to be in the predetermined background color.

Therefore, it is possible to initialize the third look-up table while maintaining the display state obtained when the value corresponding to the α value in the first look-up table reaches its maximum value, the display state being similar to one in which the composite screen and the image display screen are superimposed with each other. Thus, it is possible to utilize the third look-up table for another display effect.

Moreover, as described above, the image processing device according to the present invention may be configured such that the value corresponding to the α value in the first look-up table, which value the changing means changes, is α value defining transmittance of a predetermined color code that is set as a background color of an image display screen; and the image processing device comprises: replacing means for, if the value corresponding to the α value in the first look-up table reaches its maximum value, (i) replacing, with the α value in the first look-up table, the value corresponding to the α value of the first look-up table in the third corresponding table changed by the changing means, and (ii) replacing, with the values indicating the intensities of R, G, and B and the value corresponding to the α value in the second look-up table, the values respectively corresponding to the values indicating the intensities of R, G, and B and the value corresponding to the α value of the second look-up table in the third look-up table updated by the updating means; display changing means for nullifying display content of the image display screen and for changing a display state to be colored according to the predetermined color code.

What is meant by "the value corresponding to the α value in the first look-up table reaches its maximum value" is a state in which the first display portion in the composite screen is displayed in a background color (e.g., black) of the image screen that is not transparent. In such a state, the image display screen is covered with the predetermined background color in its portion where the image display screen is superimposed with the composite screen.

With this configuration, because the replacing means and the display changing means are provided, it is possible to initialize the updated third look-up table, that is, to return the third look-up table to as state in which the image display screen is displayed with the composite screen being transparent, and it is possible to cause the image display screen to be in the predetermined background color.

Therefore, it is possible to initialize the third look-up table while maintaining the display state obtained when the value corresponding to the α value in the first look-up table reaches its maximum value, the display state being similar to one in which the composite screen and the image display screen are superimposed with each other. Thus, it is possible to utilize the third look-up table for another display effect.

As described above, the control method according to the present invention for controlling the image processing device may comprise: an output step for reading out image data constituting the composite screen thus created by the creating step, and image data constituting a third display screen, which is another display screen than the first display screen and the second display screen, and for outputting an image in which the composite screen is superimposed with the third display screen.

According to the method, it is possible to create a composite screen by combining the first display screen and the second display screen by the creating step, and to perform the output step to output the composite screen and the third display screen in such a manner that the composite screen and the third display screen are superimposed with reach other. Thus, as to data to read out, it is only required to read out the image data constituting the composite screen and the image data constituting the image display screen. Compared with the configuration in which image data for the first, second, and third display screens are concurrently read out, the above arrangement requires a smaller data amount to read out, and thus can reduce the memory band width necessary for reading-out.

Therefore, the control method according to the present invention for controlling the image processing device can attain a display effect obtainable by combining a plurality of OSD display images, without requiring an increase in the memory bandwidth for reading out the image data.

The image processing device may be realized by using a computer. In this case, the present invention encompass (i) a control program for controlling an image processing device, the control program causing a computer to function as the means in the image processing device so as to realize the image processing device, and (ii) a computer-readable recording medium in which a control program is stored.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

According to the present invention, a process for combining a plurality of OSD planes can be such that, according to a change in an α value indicating transmittance of index colors in one of the plurality of OSD planes, at least one of R, G, B and α values in the index color in another one of the plurality of OSD planes can be changed. Thus, the present invention is widely applicable to technologies for displaying a product of combining a plurality of OSD planes expressed in the index color expression.

Reference Signs List

1: Television Broadcast Receiving Device
   (image processing Device)
7: Liquid Crystal Display Device
18: Image Processing Section
19: Display Control Section (Output Means)
24: OSD Processing Section
   (Creating Means•Composite Screen Creating Means)
26: Adder Circuit
27: Communication Control Section
28: RAM (Memory Device)
29: IP Broadcast Tuner Section
30: CPU
40: Composite Processing Section (Creating Means)
41: Index Color Obtaining section
   (Look-up Table Creating Section)
43: Fading Start Instructing Section (Changing Means)
44: Color Updating Section (Updating Means)
45: Synthesis Instructing Section
46: Image Conversion Instructing Section
   (Replacing Means•Display Changing Means)
51: OSD Plane U Data
52: OSD Plane L Data
53: OSD Plane U Index Color (Second Lookup Table)
54: OSD Plane L Index Color (First Lookup Table)
55: OSD Plane C Index Color (Third Lookup Table)
56: Copy Data

The invention claimed is:

1. An image processing device, which combines a first display screen and a second display screen, which are display screens expressed in index color expression in which pixel colors of pixels are indicated by color codes selected and combined as necessary from among R, G, and B, the image processing device comprising:
   a memory device for storing therein a first look-up table and a second look-up table, wherein the first look-up table shows association between the color codes and RGB expression for the pixel colors of the pixels constituting the first display screen, and includes values respectively indicating intensities of R, G, and B, and an α value indicating transmittance, and the second look-up table shows association between the color codes and RGB expression for the pixel colors of the pixels constituting the second display screen, and includes values respectively indicating intensities of R, G, and B, and an α value indicating transmittance; and
   creating means for creating a composite screen in the index color expression by combining the first display screen and the second display screen in such a manner that a display effect obtainable by superimposing the first display screen and the second display screen is obtained,
   the creating means including:
   look-up table creating means for creating, from the first look-up table and the second look-up table, a third look-up table for showing association between color codes and RGB expression for pixel colors of pixels constituting the composite screen;
   changing means for changing the third look-up table in such a manner that values respectively corresponding to the values respectively indicating intensities of R, G, and B, and the α value of a certain color code in the first look-up table are changed;
   updating means for rewriting the third look-up table in such a manner that, based on the values changed by the changing means, values respectively corresponding to the values respectively indicating intensities of R, G, and B, and the α value in the second look-up table are rewritten so as to obtain color expression corresponding to colors obtainable by superimposing the first display screen and the second display screen; and
   composite screen creating means for creating the composite screen by referring to the third look-up table thus rewritten by the updating means.

2. The image processing device as set forth in claim 1, comprising:
   output means for reading out image data constituting the composite screen thus created by the creating means, and image data constituting a third display screen, which is another display screen than the first display screen and the second display screen, and for outputting an image in which the composite screen is superimposed with the third display screen.

3. The image processing device as set forth in claim 1, wherein:
   the larger the α values in the first look-up table and the second look-up table, the smaller the transmittances indicated by the α values; and
   the changing means changes the third look-up table in such a manner that the value corresponding to the α value in the first look-up table is increased stepwise within a predetermined time period.

4. The image processing device as set forth in claim 1, wherein:
   the larger the α values in the first look-up table and the second look-up table, the smaller the transmittances indicated by the α values; and
   the changing means changes the third look-up table in such a manner that the value corresponding to the α value in the first look-up table is reduced stepwise within a predetermined time period.

5. The image processing device as set forth in claim 1, wherein:
   the larger the α values in the first look-up table and the second look-up table, the smaller the transmittances indicated by the α values; and
   the changing means changes the third look-up table in such a manner that the value corresponding to the α value in the first look-up table is alternatively switched over between predetermined two different values at predetermined time intervals.

6. The image processing device as set forth in claim 3, wherein:

the value corresponding to the α value in the first look-up table, which value the changing means changes, is a value defining transmittance of a predetermined color code that is set as a background color of an image display screen; and the image processing device comprises:

copying means for creating a copy data of the third look-up table thus created by the look-up table creating means, and for storing the copy of the third look-up table in the memory device;

replacing means for, if the value corresponding to the α value in the first look-up table reaches its maximum value, replacing, with contents of the copy data, contents of the third look-up table thus updated by the updating means updating in association with the change in the value corresponding to the α value in the first table by the changing means; and display changing means for nullifying display content of the image display screen and for changing a display state to be colored according to the predetermined color code.

7. The image processing device as set forth in claim 3, wherein:

the value corresponding to the α value in the first look-up table, which value the changing means changes, is a value defining transmittance of a predetermined color code that is set as a background color of an image display screen; and the image processing device comprises:

replacing means for, if the value corresponding to the α value in the first look-up table reaches its maximum value, (i) replacing, with the α value in the first look-up table, the value corresponding to the α value of the first look-up table in the third corresponding table changed by the changing means, and (ii) replacing, with the values indicating the intensities of R, G, and B and the value corresponding to the α value in the second look-up table, the values respectively corresponding to the values indicating the intensities of R, G, and B and the value corresponding to the α value of the second look-up table in the third look-up table updated by the updating means;

display changing means for nullifying display content of the image display screen and for changing a display state to be colored according to the predetermined color code.

8. A control method for controlling an image processing device, which combines a first display screen and a second display screen, which are display screens expressed in index color expression in which pixel colors of pixels are indicated by color codes selected and combined as necessary from among R, G, and B, wherein:

the image processing device includes a memory device for storing therein a first look-up table and a second look-up table, wherein the first look-up table shows association between the color codes and RGB expression for the pixel colors of the pixels constituting the first display screen, and includes values respectively indicating intensities of R, G, and B, and an α value indicating transmittance, and the second look-up table shows association between the color codes and RGB expression for the pixel colors of the pixels constituting the second display screen, and includes values respectively indicating intensities of R, G, and B, and an α value indicating transmittance, the method comprises:

creating a composite screen in the index color expression by combining the first display screen and the second display screen in such a manner that a display effect obtainable by superimposing the first display screen and the second display screen is obtained, the step of creating including:

a look-up table creating step for creating, from the first look-up table and the second look-up table, a third look-up table for showing association between color codes and RGB expression for pixel colors of pixels constituting the composite screen;

a changing step for changing the third look-up table in such a manner that values respectively corresponding to the values respectively indicating intensities of R, G, and B, and the α value of a certain color code in the first look-up table are changed;

an updating step for rewriting the third look-up table in such a manner that, based on the values changed by the changing step, values respectively corresponding to the values respectively indicating intensities of R, G, and B, and the α value in the second look-up table are rewritten so as to obtain color expression corresponding to colors obtainable by superimposing the first display screen and the second display screen; and a composite screen creating step for creating the composite screen by referring to the third look-up table thus rewritten by the updating step.

9. The method as set forth in claim 8, comprising:

an output step for reading out image data constituting the composite screen thus created by the creating step, and image data constituting a third display screen, which is another display screen than the first display screen and the second display screen, and for outputting an image in which the composite screen is superimposed with the third display screen.

10. A computer-readable recording medium in which a control program for an image processing device as set forth in claim 1 is stored, the control program causing a computer to function as the means in the image processing device.

* * * * *